United States Patent [19]

Yin et al.

[11] Patent Number: 5,740,469

[45] Date of Patent: Apr. 14, 1998

[54] APPARATUS FOR DYNAMICALLY READING/WRITING MULTIPLE OBJECT FILE FORMATS THROUGH USE OF OBJECT CODE READERS/WRITERS INTERFACING WITH GENERALIZED OBJECT FILE FORMAT INTERFACE AND APPLICATIONS PROGRAMMERS' INTERFACE

[75] Inventors: Weiping Yin; Paul Hancock; Alan Weiner, all of Austin, Tex.

[73] Assignee: Motorola Inc., Schaumburg, Ill.

[21] Appl. No.: 426,862

[22] Filed: Apr. 24, 1995

[51] Int. Cl.$^6$ .................................................. G06F 5/00
[52] U.S. Cl. ........................ 395/885; 395/704; 395/520
[58] Field of Search ................................ 395/700, 275, 395/600, 500, 601, 650, 885, 704, 442, 520; 382/1

[56] References Cited

U.S. PATENT DOCUMENTS

| | | | |
|---|---|---|---|
| 4,751,740 | 6/1988 | Wright | 382/1 |
| 5,097,533 | 3/1992 | Burger et al. | 395/500 |
| 5,119,465 | 6/1992 | Jack et al. | 395/500 |
| 5,280,613 | 1/1994 | Chan et al. | 395/700 |
| 5,313,635 | 5/1994 | Ishizuka et al. | 395/700 |
| 5,339,419 | 8/1994 | Chan et al. | 395/700 |
| 5,339,431 | 8/1994 | Rupp et al. | 395/700 |
| 5,339,433 | 8/1994 | Frid-Nielsen | 395/700 |
| 5,363,487 | 11/1994 | Willman et al. | 395/275 |
| 5,371,885 | 12/1994 | Letwin | 395/600 |
| 5,421,001 | 5/1995 | Methe | 395/500 |
| 5,421,015 | 5/1995 | Khoyi et al. | 395/650 |
| 5,561,800 | 10/1996 | Sabatella | 395/700 |
| 5,574,903 | 11/1996 | Szymanski et al. | 395/601 |
| 5,636,357 | 6/1997 | Weiner | 395/442 |

FOREIGN PATENT DOCUMENTS 96106279  12/1996  European Pat. Off. .......... G06F 9/45

OTHER PUBLICATIONS

Allen, et al.; "Program Loading inOSF/1"; Proceedings of the Winter 1991 USENIX Conference; pp. 145–160 (1991).

Kuo, et al: "A Retargetable Compiler for the Generation of Control Routines of Microprocessor–Based Digital Systems"; pp. 469–476, (1990).

*Primary Examiner*—Thomas C. Lee
*Assistant Examiner*—David Ton
*Attorney, Agent, or Firm*—Bruce E. Hayden

[57] ABSTRACT

An apparatus for allowing a single software Tool (136) to read and write multiple Object File Formats utilize dynamically configurable and loadable Object File Readers (131) and Writers (139). A separate Reader (131) and Writer (139) can be implemented for each different Object File Format and variations thereof. Tools (136) communicate with the Readers (131) and Writers (139) using a Generalized Object File Program Interface (124). This Interface (124) utilizes Data Structures implementing a Generalized Object File Internal Representation (122) and an Applications Programmers Interface (120).

8 Claims, 5 Drawing Sheets

FIG. 2 -PRIOR ART-

APPARATUS FOR DYNAMICALLY READING/WRITING MULTIPLE OBJECT FILE FORMATS THROUGH USE OF OBJECT CODE READERS/WRITERS INTERFACING WITH GENERALIZED OBJECT FILE FORMAT INTERFACE AND APPLICATIONS PROGRAMMERS' INTERFACE

FIELD OF THE INVENTION

The present invention generally relates to a data processing interface, and more specifically to dynamically reading and writing different object file formats.

BACKGROUND OF THE INVENTION

There is often a need for compatibility between tools from different vendors. One vendor may manufacture a superior compiler, but its debugger may not be as good as that from some other vendor. Likewise, another vendor may excel at debuggers. It would be helpful for a purchaser of software tools to be able to mix and match tools, instead of being locked into a specific vendors line of tools.

A number of approaches have been tried to achieve this compatibility. One approach has been to translate source code files. Unfortunately, this translation is rarely 100% effective. Also, it is only practical for one-time translations.

Another approach has been to directly read multiple object file formats. This has not been successful for a number of reasons. First, many vendors keep their object fie formats confidential. Secondly, adding or modifying formats requires relinking of the tool. Similar problems arise when object files are translated from one format to another.

Another approach has been to require conformance to a standardized object code format. This has not worked well for a number of reasons. First, it is difficult to impose standards upon established markets. Secondly, standards are invariably written to the lowest common denominator. This results in features lost in vendor product lines.

Several vendors, such as Intermetrics, have developed static converters for converting from their proprietary object code format to other object code formats.

SUMMARY OF THE INVENTION

In accordance with the invention, an apparatus is provided for allowing a single software Tool to read and write multiple Object File Formats utilizing dynamically configurable and loadable Object File Readers and Writers. A separate Reader and Writer can be implemented for each different Object File Format and variations thereof. Tools communicate with the Readers and Writers using a Generalized Object File Program Interface. This Interface utilizes Data Structures implementing a Generalized Object File Internal Representation and an Applications Programmers Interface (API).

These and other features, and advantages, will be more clearly understood from the following detailed description taken in conjunction with the accompanying drawings. It is important to point out that there may be other embodiments of the present invention which are not specifically illustrated.

DETAILED DESCRIPTION OF A PREFERRED EMBODIMENT

Figure 1:
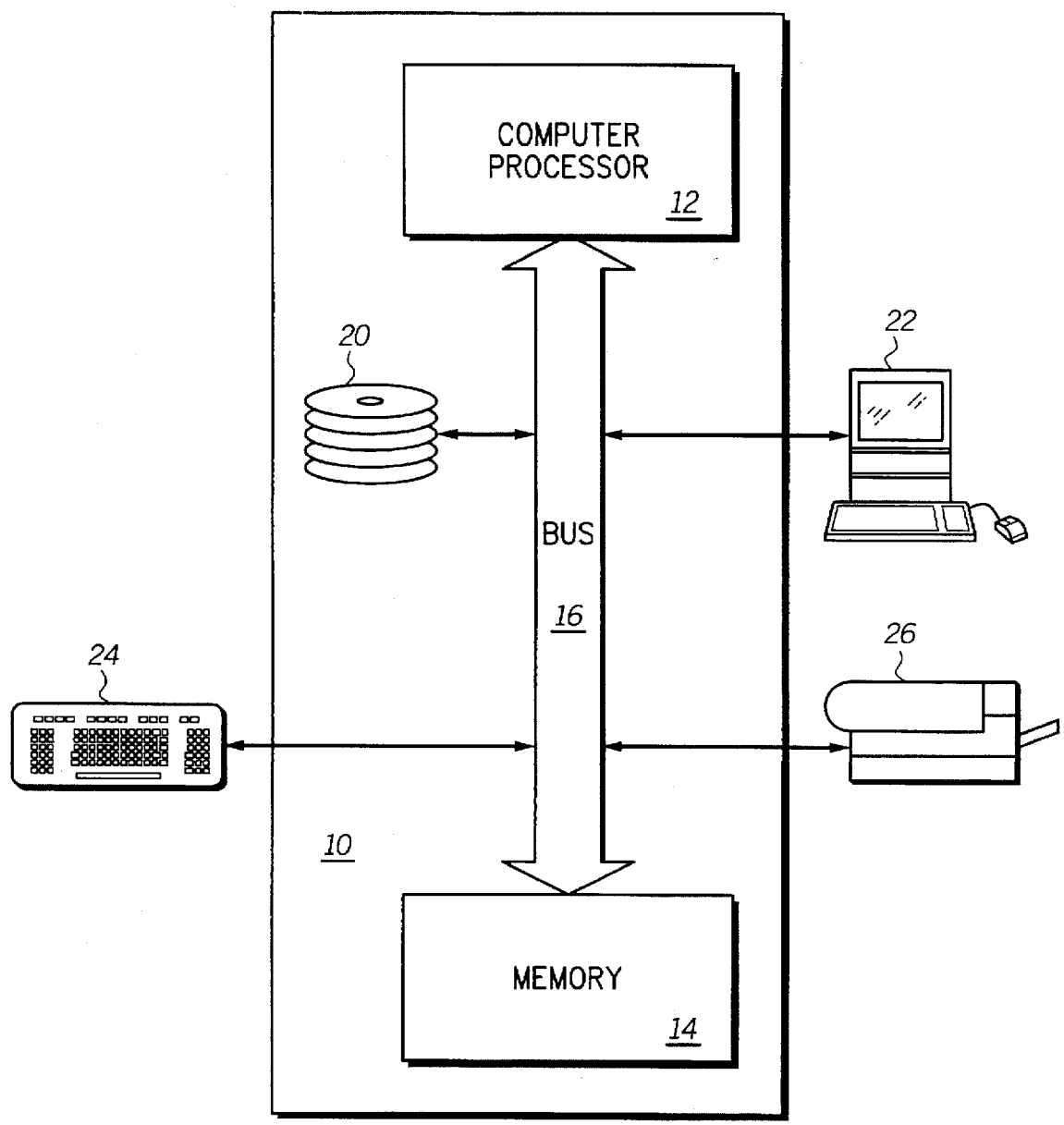
FIG. 1 is a block diagram showing the hardware components of the present invention.

Building a program that can be loaded into a computer memory and executed by a computer processor is a process known and utilized by all computer programmers. High level languages, such as C, C++, FORTRAN, COBOL, PL/1, Basic, Pascal, etc. are encoded by programmers in source files. These files contain instructions to the appropriate compilers, which differ from language to language, and indeed from language derivative to derivative. Source code files are read by compilers, which generate either assembler source code or Relocation Level Object Files. Assemblers are programs that translate symbolic encodings of machine level code into Relocation Level Object Files. Relocation Level Object Files are combined by linkers into Execution Level Object Files. In may cases, these Execution Level Object Files are directly loadable and executable by computer processors. In other cases, further transformations must be performed on the Execution Level Object Files before they are ready for execution.

There are currently dozens, if not hundred, of Object File Formats in use by development tools vendors on many platforms. For example, developers employed by the original assignee of this invention, Motorola, Inc., utilize at a minimum three major families of object file formats: COFF (Common Object File Format, developed by AT&T), ELF (Executable and Linkable Format, developed by the Tools Interface Standards Committee), and IEEE695 (an IEEE standard originally developed by Hewlett Packard and Microtec Research, Inc.) Most of these families contain a number of derivatives. Many proprietary Object File Formats belonging to these families are currently in use.

Finding a way to make Tools using different Object File Formats has presented a major obstacle for Tool vendors. Previous solutions to this problem have involved providing a plethora of translators from one Object File Format to the next, or creating universal standards which all vendors must follow. Both of these solutions involve considerable effort, and have not lived up to the expectations of their proponents.

This invention addresses the problem by providing a mechanism for making Tools using various Object File Formats work together at a level never before achieved. Each vendor of a Tool or proprietary Object File Format need only provide a single Reader and a single Writer for its Object File Format. All Tools using this invention could then read and write those object files. Note that though reference is made here to a single Reader and a single Writer, it is envisioned that some vendors may elect to combine both functions into a single Reader/Writer.

Many vendors regard their Object File Formats as trade secrets which should never be disclosed. These often offer what that vendor considers to be enhancements to a more standardized Object File Format, such as COFF, ELF, or IEEE695. This invention allows vendors to maintain their trade secrets, while making the vendors Tools interoperable with Tools from other vendors.

FIG. 1 is a block diagram showing the hardware components of this invention. A general purpose computer 10 contains a computer Processor ("CPU") 12 usually connected via a Bus 16 to a Memory 14. Also connected to the Bus 16 are one or more Disk drives 20, a CRT monitor 22, a keyboard 24, and a printer 26.

Figure 2:
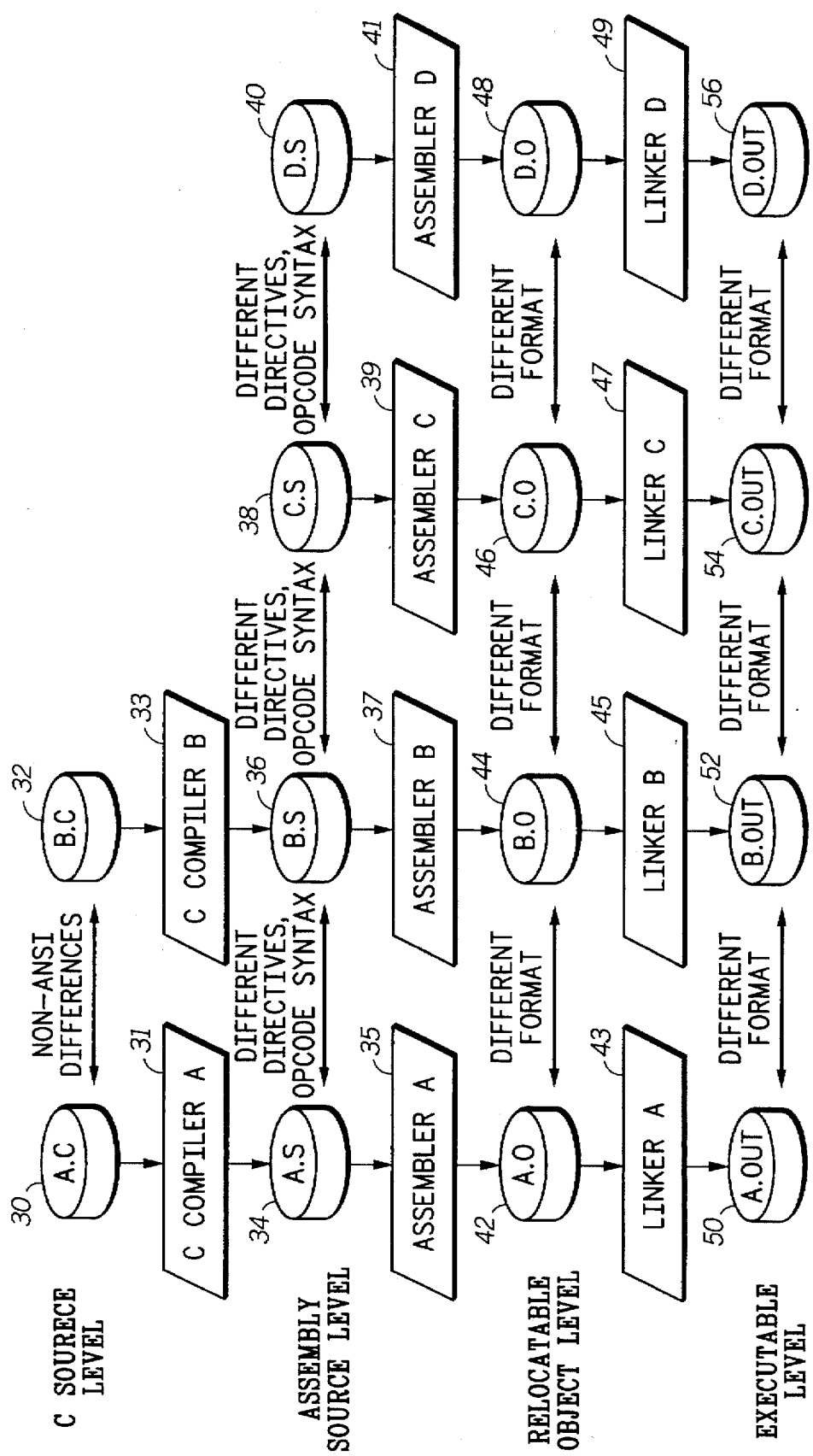
FIG. 2 is a general system overview that illustrates the problem solved with the present invention and the Prior Art solutions thereof.

FIG. 2 is a general system overview that illustrates the problem solved with this invention and the prior art solutions thereof. A.C 30 and B.C 32 are files located on disk 20 containing C language code. While there is an ANSI standard for C language compilers, most compiler vendors implement non-ANSI standard differences in their compilers. These differences are usually of two different types: either limitations, or extensions. Limitations often come about because a vendor does not think implementation of some obscure features makes economic sense. Extensions on the other hand are additions to a language. They can be features a vendor thinks helpful. Note that the usage of the C language herein is by example only. Slightly different source code language specifications have plagued compiler writers since early FORTRAN and COBOL, and continue with C++.

The A.C 30 source is compiled with C compiler A 31 into assembly source code A.S 34. Likewise, B.C 32 source code is compiled with C compiler B 33 into assembly source code B.S 36. Often, the A.C 30 source code will not be completely compilable with the B compiler 33, and the B.C 32 source code will not be completely compilable with the A compiler 31. Note that many modern compilers do not actually generate symbolic assembler code, but rather utilize for efficiency an internal assembler format.

Four different assembly language source files are shown, A.S 34, B.S 36, C.S 38, and D.S 40. Assembly language formats are even more likely to vary than higher languages because they are less likely to be subject to some international standard. Though these assembler source file formats often generate code for the same physical architectures, they do it differently. Instruction layout may differ. More importantly, the assembler pseudo-operations used to direct the assemblers vary widely.

The A.S 34 assembler source code is assembled by the A Assembler 35, while the B.S 36 assembler source is assembled by the B assembler 37, the C.S 38 assembler source is assembled by the C assembler 39, and the D.S 40 assembler source is assembled by the D assembler 41. As with compilers, assembler source code is often not compatible across different assemblers. For example, the B assembler 37 will often be unable to assemble C.S 38 assembler code created to be assembled with the C assembler 39.

Each of the four assemblers shown above will probably generate differently formatted Relocation Level Object Files. For example, assembler A 35 will produce Relocation Level Object File A.O 42, assembler B 37 will produce Relocation Level Object File B.O 44, assembler C 39 will produce Relocation Level Object File C.O 46, and assembler D 41 will produce Relocation Level Object File D.O 48.

Relocation Level Object Files are combined by a linker to form Execution Level Object Files. In many computer architectures, these Execution Level Object Files may be directly loaded into Memory and executed. Usually it is necessary to link Relocation Level Object Files created with one vendor's assembler or compilers with that same vendor's linker. Thus, Relocation Level Object Files A.O 42 is linked with the A linker 43 into Execution Level Object File A.OUT 50, while Relocation Level Object File B.O 44 is linked with the B linker 45 into Execution Level Object File B.OUT 52, Relocation Level Object File C.O 46 is linked with the C linker 47 into Execution Level Object File C.OUT 54, and Relocation Level Object File D.O 48 is linked with the D linker 49 into Execution Level Object File D.OUT 56.

As with Relocation Level Object File, often Execution Level Object Files formats differ from one vendor to another, and from one linker to another. This is especially true, where the Execution Level Object Files are not directly executable, but rather must be further translated before usage. One example of this is the use of an S-Record Generator 84 (shown in FIG. 3) to generate loadable S-Records (App. HEX) 86. In such a case, each linker vendor would usually create its own S-Record Generator 84, recognizing its own Execution Level Object File Format.

Figure 3:
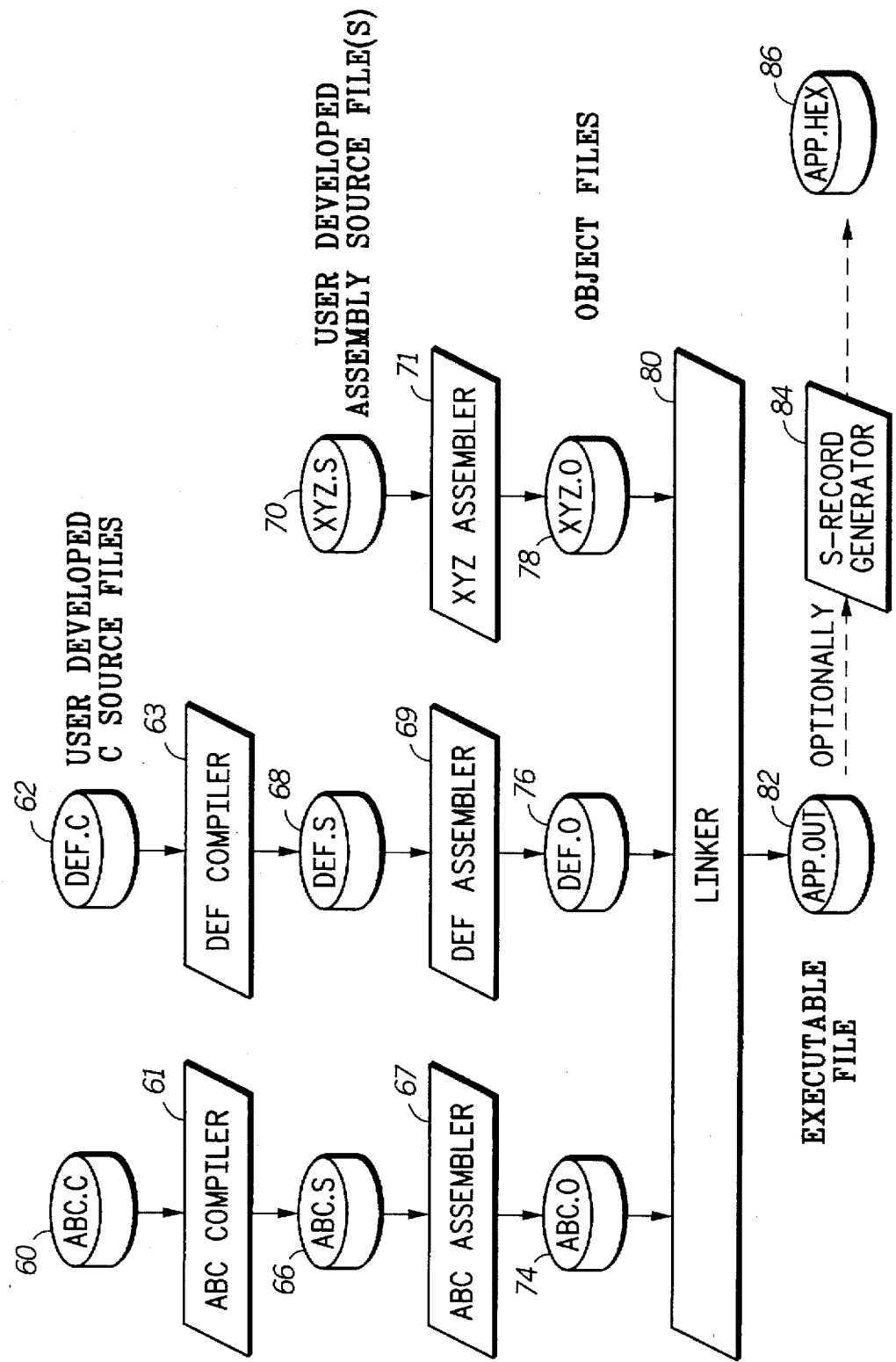
FIG. 3 is a block diagram showing how the present invention differs from the Prior Art as shown in FIG. 2.

FIG. 3 is a block diagram showing how this invention differs from the prior art as shown in FIG. 2. Again, we have two different source code formats compiled by their respective compilers: C source ABC.C 60 is compiled with ABC compiler 61 which generates ABC.S 66 assembler source, while C source code DEF.C 62 is compiled with DEF compiler 63 which generates DEF.S assembler source code 68. Likewise, assembler ABC 67 assembles assembler source format ABC.S 66 into Relocation Level Object File Format ABC.O 74, while assembler DEF 69 assembles assembler source format DEF.S 68 into Relocation Level Object File Format DEF.O 76 and assembler XYZ 71 assembles assembler source format XYZ.S 70 into Relocation Level Object File Format XYZ.O 78.

This is the point at which this invention becomes readily distinguishable from the prior art. All three Relocation Level Object File Formats ABC.O 74, DEF.O 76, and XYZ.O 78 can be linked using the same linker 80 to produce an Execution Level Object File APP.OUT 82. Additionally, should different linkers 80 be used (as was shown in FIG. 2), and different Execution Level Object File Format files are generated, a common S-Record Generator 84 can be used to translate the different Executable Level Object Files APP.OUT 82 into S-Records APP.HEX 86.

Figure 4:
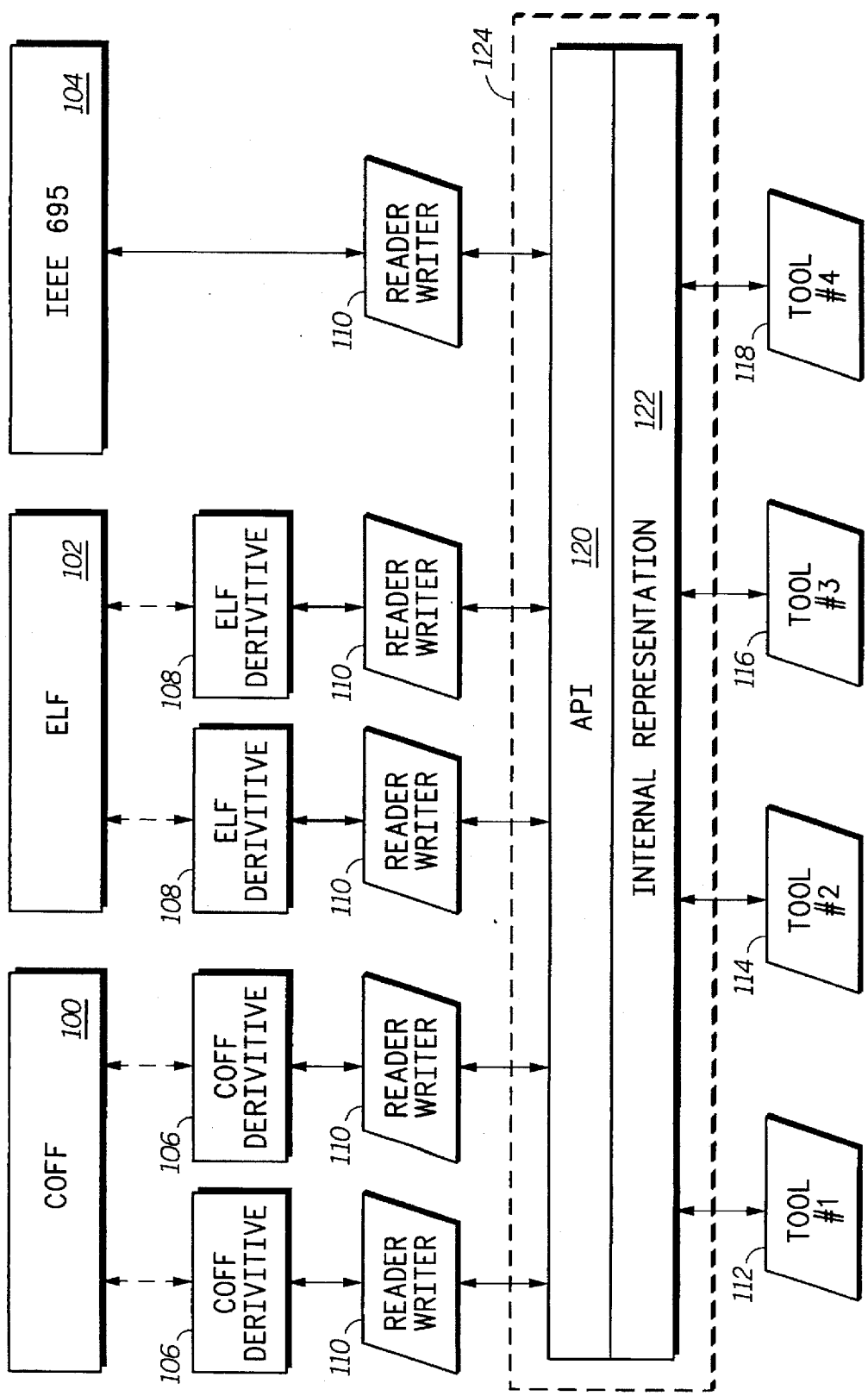
FIG. 4 is a block diagram showing how to read and write different Object File Formats in accordance with this invention.

FIG. 4 is a block diagram showing how this invention is able to read and write different Object File Formats. Three different Object File Formats are shown: COFF 100, ELF 102, and IEEE695 104. COFF 100 has several COFF derivatives 106, and ELF 102 has several ELF derivatives 108. For each COFF derivative 106, ELF derivative 108, and for IEEE695 104, a Reader/Writer 110 is written. The Reader portion of the Reader/Writer 110 is used to read the Object File, while the Writer portion of the Reader/Writer 110 is used to write an Object File in the specified Object File Format.

On the other side, each Tool 112, 114, 116, 118, would have a Generalized Object File Program Interface 124. The Generalized Object File Program Interface 124 comprises essentially two parts: an Application Programmers' Interface ("API") 120, and an Generalized Object File Internal Representation 122.

Some of the Tools 112, 114, 116, 118 that can benefit from this Generalized Object File Program Interface 124 are compilers 64, assemblers 72, linkers 80, loaders (not shown), debuggers (not shown), simulators (not shown), emulators (not shown), disassemblers (not shown), and S-Record Generators 84 (see FIG. 3). Compilers 64 and assemblers 71 can utilize Writers to write Relocation Level Object Files. Linkers 80 and debuggers can utilize Readers to read Relocation Level Object Files. Linkers 80 can utilize Writers to write Execution Level Object Files. Linkers 80, loaders, debuggers, simulators, emulators, disassemblers, and S-Record Generators 84 (see FIG. 3) can utilize Readers to read Execution Level Object Files. Note that the above Reader and Writer users are suggestive only. The Generalized Object File Program Interface 124 is useful to any tools that either read or write object files.

Figure 5:
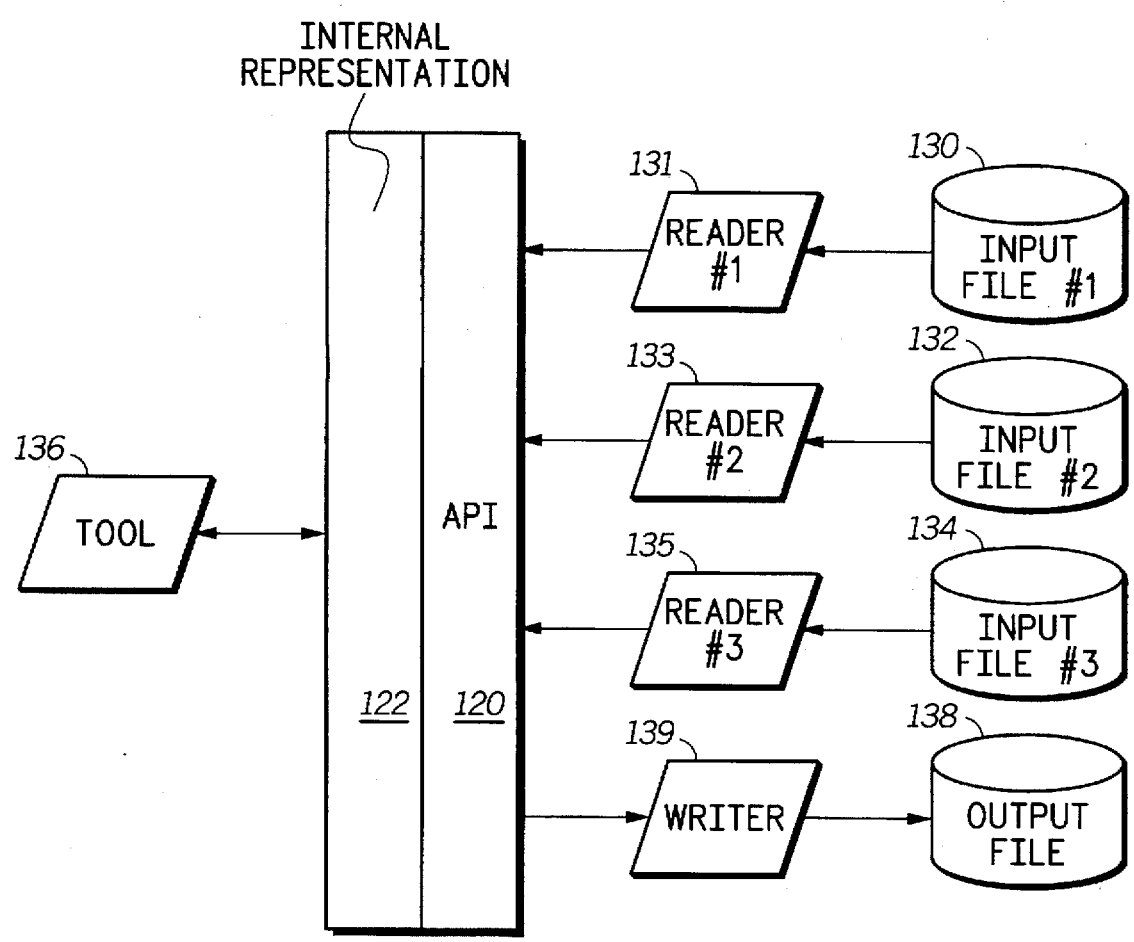
FIG. 5 is a block diagram showing how multiple Object Files can be combined using a single Tool in accordance with this invention.

FIG. 5 is a block diagram showing how multiple Object Files can be combined using a single Tool. Input File #1 130 has a corresponding Reader #1 131, while Input File #2 132 has corresponding Reader #2 133, and Input File #3 134 has corresponding Reader #3 135. Each of these Object Files is located on a Disk Drive 10 (see FIG. 1) and may be a different Object File Format. For example, Input File #1 130 may be encoded with a COFF derivative 106, Input File #2 131 with an ELF derivative 108, and Input File #3 134 with IEEE695 104. In that case, Reader #1 131 would read that COFF derivative 106, Reader #2 133 would read that ELF derivative 108, and Reader #3 135 would read IEEE695 104 formatted Object Files.

A single Tool 136, such as a linker, could thus read each of the Object File Formats. Indeed, as shown here, these different Object File Formats can be mixed. One example is that relocatable Object Files from assemblers and compilers from different vendors can be combined into a single executable object file. Vendors can maintain secrecy as to their proprietary Object Code Format even while delivering Reader/Writer black boxes to their customers.

The Tool 136 reads each of the input files 130, 132, 134 through the corresponding Readers 131, 133, 135. It can then write an Output File 138 of a specified Object File Format through use of the appropriate Writer 139. The Tool 136 communicates with the Readers 131, 133, 135, and the Writer 139 through the Generalized Object File Program Interface 124. The Generalized Object File Program Interface 124 has essentially two parts: an Application Programmers' Interface ("API") 120, and a Generalized Object File Internal Representation 122.

Preferably, Readers and Writers for the various Object Code Formats are written as Dynamically Loadable Modules ("DLM"s). For example, under Microsoft Windows, Dynamic Linkable Libraries ("DLL"s) may be used to implement Readers and Writers. There are usually separate DLM Reader and Writer modules for each Object File Format, and derivatives thereof. In the preferred embodiment, each of the Tools 136, Readers 131, and Writers 139, when activated, is located in a separate partition, segment, or address space in Memory 14.

Included in each Tool 136 is an Application Programmers' Interface ("API") 120, where selection of which Readers and Writers can be dynamically performed based on Object File Format. The API combined with the use of DLMs allows addition and modification of Object File Readers 131 and Writers 139 without the necessity of relinking Tools 136. This flexibility can be extended by using a configuration file (not shown) stored on Disk 20 (see FIG. 1) to dynamically select which DLM Reader and Writer modules to load and access for which Object File Formats.

The Tools 136 and the Readers 131 and Writers 139 communicate through sharing an Generalized Object File Internal Representation 122. This Generalized Object File Internal Representation 122 primarily comprises Data Structures stored in Memory 14 (see FIG. 1). In the preferred embodiment, an object-oriented language such as C++ is used to specify classes and subclasses of objects. These objects include Data Structures used to pass information between the Tools 136 and the Readers 131 and Writers 139. The Generalized Object File Internal Representation 122 is a generalized or virtualized Object File Format. It usually is a super-set of each of the Object File Formats, forming a union of the capabilities available in the various Object File Formats supported by the Generalized Object File Internal Representation 122. A partial example of a C++ implementation supporting COFF, ELF, and IEEE695 is included herein as an Appendix.

A Tool 136 communicates with Readers 131 and Writers 139 by first inserting commands and data into Generalized Object File Internal Representation 122 Data Structures stored in Memory 14. One of the Readers 131 or Writers 139 is selected based on Object File Format. The API is then invoked to transfer the Data Structures from the Tool 136 to the selected Reader 131 or Writer 139. The selected Reader 131 or Writer 139 executes the command, reading or writing (as appropriate) from/to the appropriate Object File. The selected Reader 131 or Writer 139 will then insert a result and possibly data into a Data Structure, which is returned through the API to the Tool 136. This is repeated as necessary.

This invention is applicable in all known general purpose computer environments. However, the capability for Dynamically Linking modules at execution time is helpful, since it obviates the need to relink Tools when Readers or Writers are modified or added. Also note that though the Appendix shows a partial example using an object-oriented language such as C++, this invention is also usable with less object-oriented languages such as the C language.

Those skilled in the art will recognize that modifications and variations can be made without departing from the spirit of the invention. Therefore, it is intended that this invention encompass all such variations and modifications as fall within the scope of the appended claims.

THE DESIGN OF THE OBJECT FILE READERS AND WRITERS

The following paper describes the API of the Dynamically Loadable Object File Readers and Writers. It also describes how to construct an object file reader or writer which will work with this API.

The Object File Readers and writers were written using object oriented design paradigms. All object file readers and writers are based upon the same objects which defines the interface used to call them. The base objects also handle all file I/O operations for the derived objects.

The Object File Readers have been implemented in C++ and make use of C++'s classes and inheritance features. However, the importance of C++ is minimal, the Object File Readers could have been written in C, Smalltalk, or any of a wide variety of other languages.

1. The Design of the Data Structures Used By The Readers, Writers, And Applications The data structures used by the object file readers and writers form half of the API. The other half consists of the function calls used to access the readers and writers. The data structures themselves were designed by taking the union of the structures found in three common object file formats: COFF (Common Object File Format), ELF (Executable Linkable Format), and IEEE695. Since the structures are a union of these object file format structures, they can be used to read all of these object file formats without loss of information. Other object file formats which contain similar structures can also use these data structures, however, they may experience some data loss in the process. All data within these structures must be accessed using function calls. This enables the storage mechanisms to be hidden and allows optimizations in some cases.

The structures are: FileHeader, Section, Reloc, Line, and Symbol.

The FileHeader structure contains the information taken from the file header (and auxiliary tie header) in the object file. Most of the information in the file header is contained as data in the reader or writer. Thus, it is most useful for diagnostic purposes since it only contains information about the object file itself and this is precisely the information which is being abstracted. The Section structure contains information taken from the section headers. It defines information about individual sections.

The Reloc structure contains information about relocation entries.

The Line structure contains information about line number entries. These are used for debugging and are only found in COFF and IEEE695 files. ELF files use DWARF debugging format, which is read and written as section data.

The Symbol structure contains information about symbols (and auxiliary symbols for COFF) in the object files. Symbols contain a lot of format specific information which must be abstracted. For instance, COFF file symbols depend upon the order of the symbols to give added meaning. This ordering information must be abstracted so that it is file format independent.

The raw section data is written out as arrays of unsigned characters.

2. The Design of the Object File Readers

The readers are based upon a generalized base class, InObj, which provides a framework and defines the interface through which clients call the readers. All format specific information must be handled through classes derived from class InObj. For instance, relocRead is declared in class InObj, but it has a trivial function body "{}." In the derived class InCOFF, relocRead will find a specific relocation entry in a COFF file and read it. The same function could be overloaded in class InIEEE to read a relocation entry from an IEEE695 file. These functions must handle all file format specific information. They must be able to find the correct location in the file for each piece of information.

Class InObj also handles all file i/o for the derived classes. It contains an object of type InEndianFile which will overload all file i/o functions to do all the byte swapping necessary to compensate for differences in endianness within the file and the host processor. Class InEndianFile overloads operator >> for several types, so that when the derived classes use these operators they will get a consistent byte ordering.

Each object file reader must have a companion function which can open a file and determine whether it is an object file of a format which that reader can recognize. If the file can be read by the reader, this function should be able to instantiate a reader for the object file and return a pointer to the reader.

With this approach, a reader may be compiled into a library and loaded at run time. Such libraries could be linked into any application with knowledge of the reader interface. Such libraries need not be known to the application when it is written, but can be linked in at a later time.

For example: suppose that one tools vendor were to write a linker with this technology. Suppose this linker runs under Microsoft Windows. Then the readers for the object files which it uses could be written as Windows DLLs. Now suppose that another vendor writes a DLL which reads its own object files. The second vendor could ship its DLL to the customers of the first vendor, and the first vendor's linker would be able to link the second vendor's object files.

Here is how it could work. First, the first vendor would have to have a means of locating the new DLL. Next, the linker could load the DLL, and call the identification function, inObjectCreate. If the call succeeds, the DLL will create an object file reader for the second vendor's object file. Since all data structures are normalized, the second vendor's reader would be virtually indistinguishable from the first vendor's reader in most important respects. Thus, the files could be linked.

Note that although this example deals with Microsoft Windows, this technology is not limited to Windows. Other operating systems may require other mechanisms, but the same results could be obtained. For instance, interprocess communications could be used under UNIX instead of DLLs.

CLASS HIERARCHY OF THE OBJECT FILE READERS

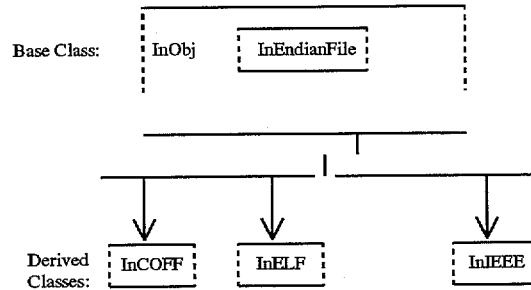

See iobj.hxx, iendfile.hxx, icreate.hxx, icoff.hxx, ielf.hxx, and iieee.hxx for prototypes of the functions used.

3. The Design of the Object File Writers

The design of the object file writers is very similar to that of the readers. Class OutObj is a base class from which all of the writers are derived. Class OutObj contains an object of type OutEndianFile which handles file i/o and endian byte swapping. However, the user of an object file writer is assumed to know what kind of object file is to be written, so there is no need for a function like inObjectCreate.

The object file writers also have some additional constraints which do not apply to the readers. The writers are responsible for calculating any file pointers within an object file. So, the writers must have information about the contents of the file before the actual data is written. For instance, the section headers contain pointers to the section data and relocation entries within the file. Thus, the writers must know how many sections there are in the file, the size of the contents of each section, the number of relocation entries, and the number of line number entries for each section before they can calculate the offsets. The object file writers ensure that they have this information by requiring that the section headers be written before any section data, relocation entries, line number entries, or symbols are written.

In most other respects, the writers are very similar in design to the readers.

Appendix
-4-

```
/************************************************************************
 *
 *
 *      COPYRIGHT (c) 1993 MOTOROLA INC.
 *      ALL RIGHTS RESERVED
 *
 *      The code is the property of Sector Technology and is Motorola
 *      Confidential Proprietary Information.
 *
 *      The copyright notice above does not evidence any
 *      actual or intended publication of such source code.
 *
 * Filename:    $Source: /usr/msa/vault/cvsroot/inc/filehdr.hxx,v $
 * Author:      $Author: aweiner $
 * Locker:      $Locker:  $
 * State:       $State: Exp $
 * Revision:    $Revision: 5.3 $
 *
 * History:     Issue RLOG command against the RCS version of this file
 *              to view revision history and lock status.
 *
 * Description: Contains the class declaration for class FileHeader.
 *
 * Notes:
 *
 ************************************************************************
 / ifndef FILEHDR_HXX
define FILEHDR_HXX static char rcs_filehdr_hxx[] = "$RCSfile: filehdr.hxx,v $ $Revision: 5.3 $"; /* RCS identifiers */ include      "mstructs.hxx"

typedef       enum {
              HEADER_TYPE_UNKNOWN=0x0,
              COFF_FILE_HEADER=0x1,COFF_OPT_HEADER=0x2,
              ELF_HEADER=0x3, ELF_PROG_HEADER=0x4,
              IEEE_HEADER=0x5
} HeaderType;

// An abstract header class.
// This class should only be used for debugging the readers and writers.
class FileHeader
{
private:// Private Data HeaderType   headerType;   // Enumerates the kind of file header.
        // The same structure is used for all file headers.
```

Copyright © 1993, 1995 Motorola, Inc.

Appendix
-5-

```
// Magic Number.
UINT16      magicNumber;

// Number of Sections.
UINT16      numSections;

// Time / Date stamp.
UINT32      timeDate;

// The number of symbols in the symbol table.
UINT32      numSymbols;

// The symbol table pointer.
UINT32      symPtr;

// The size of the optional header.
UINT16      sizeOptional;

// The file flags (as read in from the file.)
UINT16      fileFlags;

// Magic Number.
UINT16      optMagicNumber;

// Version Stamp.
UINT16      versionStamp;

// Size of the text section.
UINT32      textSize;

// Size of the data section.
UINT32      dataSize;

// Size of the bss section.
UINT32      bssSize;

// The entry point.
UINT32      entry;

// The base of the code.
UINT32      textBase;

// The base of the data.
UINT32      dataBase;

public: //   Public data.

FileHeader   *nextFileHeader;    // A pointer to another header.
```

Copyright © 1993, 1995 Motorola, Inc.

Appendix
-6-

```
public: //      Public functions.

FileHeader  (void): headerType (HEADER_TYPE_UNKNOWN),
                                                nextFileHeader (NULL)
                                       { };
        ~FileHeader (void) { };

HeaderType getHeaderType () const { return headerType; };
        void    setHeaderType (const HeaderType  type) { headerType = type; } void link ( FileHeader* headerPtr) { nextFileHeader = headerPtr; }
        void unlink () { nextFileHeader = NULL; }
        void remove (); // Deletes and unlinks nextFileHeader.

// COFF File Header Accessor Functions.
        inline  UINT16 getMagicNumber   (void) const;
        inline  UINT16 getNumSections   (void) const;
        inline  UINT32 getTimeDate      (void) const;
        inline  UINT32 getNumSymbols    (void) const;
        inline  UINT32 getSymPtr                (void) const;
        inline  UINT16 getSizeOptional  (void) const;
        inline  UINT16 getFileFlags     (void) const;
        inline  void    setMagicNumber          (const UINT16 val);
        inline  void    setNumSections          (const UINT16 val);
        inline  void    setTimeDate             (const UINT32 val);
        inline  void    setNumSymbols           (const UINT32 val);
        inline  void    setSymPtr               (const UINT32 val);
        inline  void    setSizeOptional  (const UINT16 val);
        inline  void    setFileFlags            (const UINT16 val);
        inline
        inline  // COFF Optional Header Accessor Functions.
        inline  UINT16 getOptMagicNumber(void) const;
        inline  UINT16 getVersionStamp          (void) const;
        inline  UINT32 getTextSize              (void) const;
        inline  UINT32 getDataSize              (void) const;
        inline  UINT32 getBssSize                       (void) const;
        inline  UINT32 getEntry                         (void) const;
        inline  UINT32 getTextBase              (void) const;
        inline  UINT32 getDataBase              (void) const;
        inline  void    setOptMagicNumber  (const UINT16 val);
        inline  void    setVersionStamp    (const UINT16 val);
        inline  void    setTextSize             (const UINT32 val);
        inline  void    setDataSize             (const UINT32 val);
        inline  void    setBssSize              (const UINT32 val);
        inline  void    setEntry                        (const UINT32 val);
        inline  void    setTextBase             (const UINT32 val);
        inline  void    setDataBase             (const UINT32 val);

void dump (void);
};
```

Copyright © 1993, 1995 Motorola, Inc.

Appendix
-7-

```
/************************************************************************
*
*
* Function:    getMagicNumber
*
* Description: Returns the magic number for the file.
*
* Note:        This is the magic number in the file header, not the auxiliary
*              file header.
*
************************************************************************
/ inline UInt16 FileHeader::getMagicNumber(void) const
{
        if (headerType == COFF_FILE_HEADER) {
                return magicNumber;
        } else {
                /* Error Condition. */
                ErrInfoerror(STRUCT_LIB, STRUCT_ERRORS[STRUCT_INVALID_HEADER_TYPE],
                                        (const char*) "FileHeader::getMagicNumber",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/************************************************************************
*
*
* Function:    getNumSections
*
* Description: Returns the number of sections in the file.
*
************************************************************************
/ inline UInt16 FileHeader::getNumSections(void) const
{
        if (headerType == COFF_FILE_HEADER) {
                return numSections;
        } else {
                /* Error Condition. */
                ErrInfoerror(STRUCT_LIB, STRUCT_ERRORS[STRUCT_INVALID_HEADER_TYPE],
                                        (const char*) "FileHeader::getNumSections",
                                        ErrInfo::ERR_ERROR,
```

Copyright © 1993, 1995 Motorola, Inc.

Appendix
-8-

```
                                        STRUCT_CONTEXT_ERROR,
                                        __FILE__,
                                        __LINE__);
                errHandle(error, ERR_PUT);
                return 0;
        }
};

/************************************************************************
 *
 *
 * Function:    getTimeDate
 *
 * Description: Returns the time/date stamp.
 *
 ************************************************************************
 / inline UInt32 FileHeader::getTimeDate(void) const
{
        if (headerType == COFF_FILE_HEADER) {
                return timeDate;
        } else {
                /* Error Condition. */
                ErrInfo error(STRUCT_LIB, STRUCT_ERRORS[STRUCT_INVALID_HEADER_TYPE],
                                        (const char*) "FileHeader::getTimeDate",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/************************************************************************
 *
 *
 * Function:    getNumSymbols
 *
 * Description: Returns the number of symbols in the file.
 *
 ************************************************************************
 / inline UInt32 FileHeader::getNumSymbols(void) const
{
        if (headerType == COFF_FILE_HEADER) {
                return numSymbols;
        } else {
                /* Error Condition. */
```

Copyright © 1993, 1995 Motorola, Inc.

Appendix
-9-

```
            ErrInfoerror(STRUCT_LIB,

STRUCT_ERRORS[STRUCT_INVALID_HEADER_TYPE],
                                    (const char*) "FileHeader::getNumSymbols",
                                    ErrInfo::ERR_ERROR,
                                    STRUCT_CONTEXT_ERROR,
                                    __FILE__,
                                    __LINE__);
            errHandle(error, ERR_PUT);
            return 0;
        }
};
/**********************************************************************
 *
 *
 * Function:    getSymPtr
 *
 * Description: Returns a file pointer to the symbol table in the file.
 *
 **********************************************************************
 / inline UInt32 FileHeader::getSymPtr(void) const
{
        if (headerType == COFF_FILE_HEADER) {
            return symPtr;
        } else {
            /* Error Condition. */
            ErrInfoerror(STRUCT_LIB, STRUCT_ERRORS[STRUCT_INVALID_HEADER_TYPE],
                                    (const char*) "FileHeader::getSymPtr",
                                    ErrInfo::ERR_ERROR,
                                    STRUCT_CONTEXT_ERROR,
                                    __FILE__,
                                    __LINE__);
            errHandle(error, ERR_PUT);
            return 0;
        }
};
/**********************************************************************
 *
 *
 * Function:    getSizeOptional
 *
 * Description: Returns the size of the optional header.
 *
 **********************************************************************
 / inline UInt16 FileHeader::getSizeOptional(void) const
{
```

Copyright © 1993, 1995 Motorola, Inc.

Appendix
-10-

```
        if (headerType == COFF_FILE_HEADER) {
                return sizeOptional;
        } else {
                /* Error Condition. */
                ErrInfoerror(STRUCT_LIB, STRUCT_ERRORS[STRUCT_INVALID_HEADER_TYPE],
                                        (const char*) "FileHeader::getSizeOptional",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/************************************************************************
*
*
* Function:    getFileFlags
*
* Description: Returns the format specific flags describing the file.
*
************************************************************************
/ inline UInt16 FileHeader::getFileFlags(void) const
{
        if (headerType == COFF_FILE_HEADER) {
                return fileFlags;
        } else {
                /* Error Condition. */
                ErrInfoerror(STRUCT_LIB, STRUCT_ERRORS[STRUCT_INVALID_HEADER_TYPE],
                                        (const char*) "FileHeader::getFileFlags",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/************************************************************************
*
*
* Function:    setMagicNumber
*
* Description: Sets the magic number in the file header.
*
* Notes:    This is the magic number in the main file header, not the
```

Copyright © 1993, 1995 Motorola, Inc.

Appendix
-11-

```
*       auxiliary header.
*
************************************************************************
/ inline void     FileHeader::setMagicNumber(const UINT16 val)
{
        if (headerType == COFF_FILE_HEADER) {
                magicNumber     = val;
        } else {
                /* Error Condition. */
                ErrInfo error(STRUCT_LIB, STRUCT_ERRORS[STRUCT_INVALID_HEADER_TYPE],
                                        (const char*) "FileHeader::setMagicNumber",
                                        ErrInfo::ERR_ERROR,
                                        STRUCT_CONTEXT_ERROR,
                                        __FILE__,
                                        __LINE__);
                errHandle(error, ERR_PUT);
                magicNumber     = 0;
        }
};

/************************************************************************
*
*
* Function:     setNumSections
*
* Description: Set the number of sections to be put in the file.
*
*************************************************************************
/ inline void     FileHeader::setNumSections(const UINT16 val)
{
        if (headerType == COFF_FILE_HEADER) {
                numSections     = val;
        } else {
                /* Error Condition. */
                ErrInfo error(STRUCT_LIB, STRUCT_ERRORS[STRUCT_INVALID_HEADER_TYPE],
                                        (const char*) "FileHeader::setNumSections",
                                        ErrInfo::ERR_ERROR,
                                        STRUCT_CONTEXT_ERROR,
                                        __FILE__,
                                        __LINE__);
                errHandle(error, ERR_PUT);
                numSections     =       0;
        }
};
```

Copyright © 1993, 1995 Motorola, Inc.

Appendix
-12-

```
/************************************************************************
*
*
* Function:   setTimeDate
*
* Description: Set the time/date stamp for the file.
*
************************************************************************
/ inline void     FileHeader::setTimeDate(const UINT32 val)
{
        if (headerType == COFF_FILE_HEADER) {
                timeDate                = val;
        } else {
                /* Error Condition. */
                ErrInfoerror(STRUCT_LIB, STRUCT_ERRORS[STRUCT_INVALID_HEADER_TYPE],
                                        (const char*) "FileHeader::setTimeDate",
                                        ErrInfo::ERR_ERROR,
                                        STRUCT_CONTEXT_ERROR,
                                        __FILE__,
                                        __LINE__);
                errHandle(error, ERR_PUT);
                timeDate                =       0;
        }
};

/************************************************************************
*
*
* Function:   setNumSymbols
*
* Description: Set the number of symbols in the symbol table for the file.
*
************************************************************************
/ inline void     FileHeader::setNumSymbols(const UINT32 val)
{
        if (headerType == COFF_FILE_HEADER) {
                numSymbols      = val;
        } else {
                /* Error Condition. */
                ErrInfoerror(STRUCT_LIB, STRUCT_ERRORS[STRUCT_INVALID_HEADER_TYPE],
                                        (const char*) "FileHeader::setNumSymbols",
                                        ErrInfo::ERR_ERROR,
                                        STRUCT_CONTEXT_ERROR,
                                        __FILE__,
                                        __LINE__);
                errHandle(error, ERR_PUT);
```

Copyright © 1993, 1995 Motorola, Inc.

Appendix
-13-

```
            numSymbols          =      0;
    }
};
/***********************************************************************
*
*
* Function:   setSymPtr
*
* Description: Set the symbol table file pointer in the file.
*
***********************************************************************
/ inline void     FileHeader::setSymPtr(const UINT32 val)
{
        if (headerType == COFF_FILE_HEADER) {
                symPtr              = val;
        } else {
                /* Error Condition. */
                ErrInfoerror(STRUCT_LIB, STRUCT_ERRORS[STRUCT_INVALID_HEADER_TYPE],
                                        (const char*) "FileHeader::setSymPtr",
                                        ErrInfo::ERR_ERROR,
                                        STRUCT_CONTEXT_ERROR,
                                        __FILE__,
                                        __LINE__);
                errHandle(error, ERR_PUT);
                symPtr              =     0;
        }
};
/***********************************************************************
*
*
* Function:   setSizeOptional
*
* Description: Set the size of the optional header for the file.
*
***********************************************************************
/ inline void     FileHeader::setSizeOptional(const UINT16 val)
{
        if (headerType == COFF_FILE_HEADER) {
                sizeOptional   = val;
        } else {
                /* Error Condition. */
                ErrInfoerror(STRUCT_LIB, STRUCT_ERRORS[STRUCT_INVALID_HEADER_TYPE],
                                        (const char*) "FileHeader::setSizeOptional",
                                        ErrInfo::ERR_ERROR,
```

Copyright © 1993, 1995 Motorola, Inc.

Appendix
-14-

```
                                        STRUCT_CONTEXT_ERROR,
                                        __FILE__,
                                        __LINE__);
            errHandle(error, ERR_PUT);
            sizeOptional    =       0;
        }
};

/************************************************************************
*
*
* Function:   setFileFlags
*
* Description: Set the format specific flags for the file.
*
************************************************************************
/ inline void     FileHeader::setFileFlags(const UINT16 val)
{
        if (headerType == COFF_FILE_HEADER) {
                fileFlags           = val;
        } else {
                /* Error Condition. */
                ErrInfoerror(STRUCT_LIB, STRUCT_ERRORS[STRUCT_INVALID_HEADER_TYPE],
                                        (const char*) "FileHeader::setFileFlags",
                                        ErrInfo::ERR_ERROR,
                                        STRUCT_CONTEXT_ERROR,
                                        __FILE__,
                                        __LINE__);
            errHandle(error, ERR_PUT);
            fileFlags           =   0;
        }
};

// COFF Optional Header Accessor Functions.
/************************************************************************
*
*
* Function:   getOptMagicNumber
*
* Description: Return the magic number in the optional header.
*
************************************************************************
/
inline UInt16 FileHeader::getOptMagicNumber(void) const
{
        if (headerType == COFF_OPT_HEADER) {
                return optMagicNumber;
        } else {
                /* Error Condition. */
                ErrInfoerror(STRUCT_LIB,
```

Copyright © 1993, 1995 Motorola, Inc.

Appendix
-15-

```
                STRUCT_ERRORS[STRUCT_INVALID_HEADER_TYPE],
                                        (const char*) "FileHeader::getOptMagicNumber",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/************************************************************************
 *
 *
 * Function:    getVersionStamp
 *
 * Description: Return the version stamp in the optional header.
 *
 ************************************************************************
/ inline UInt16 FileHeader::getVersionStamp          (void) const
{
        if (headerType == COFF_OPT_HEADER) {
                return versionStamp;
        } else {
                /* Error Condition. */
                ErrInfo error(STRUCT_LIB, STRUCT_ERRORS[STRUCT_INVALID_HEADER_TYPE],
                                        (const char*) "FileHeader::getVersionStamp",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/************************************************************************
 *
 *
 * Function:    getTextSize
 *
 * Description: Return the text size in the auxiliary header.
 *
 ************************************************************************
/ inline UInt32 FileHeader::getTextSize          (void) const
{
```

Copyright © 1993, 1995 Motorola, Inc.

Appendix
-16-

```
        if (headerType == COFF_OPT_HEADER) {
                return textSize;
        } else {
                /* Error Condition. */
                ErrInfo error(STRUCT_LIB, STRUCT_ERRORS[STRUCT_INVALID_HEADER_TYPE],
                                        (const char*) "FileHeader::getTextSize",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/***********************************************************************
*
*
* Function:   getDataSize
*
* Description: Return the data size in the auxiliary header.
*
***********************************************************************
/ inline UInt32 FileHeader::getDataSize              (void) const
{
        if (headerType == COFF_OPT_HEADER) {
                return dataSize;
        } else {
                /* Error Condition. */
                ErrInfo error(STRUCT_LIB, STRUCT_ERRORS[STRUCT_INVALID_HEADER_TYPE],
                                        (const char*) "FileHeader::getDataSize",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/***********************************************************************
*
*
* Function:   getBssSize
*
* Description: Return the bss size in the auxiliary header.
*
```

Copyright © 1993, 1995 Motorola, Inc.

Appendix
-17-

```
************************************************************************
/ inline UInt32 FileHeader::getBssSize          (void) const
{
        if (headerType == COFF_OPT_HEADER) {
                return bssSize;
        } else {
                /* Error Condition. */
                ErrInfo error(STRUCT_LIB, STRUCT_ERRORS[STRUCT_INVALID_HEADER_TYPE],
                                        (const char*) "FileHeader::getBssSize",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/************************************************************************
*
*
* Function:   getEntry
*
* Description: Return the entry point in the auxiliary header.
*
************************************************************************
/ inline UInt32 FileHeader::getEntry            (void) const
{
        if (headerType == COFF_OPT_HEADER) {
                return entry;
        } else {
                /* Error Condition. */
                ErrInfo error(STRUCT_LIB, STRUCT_ERRORS[STRUCT_INVALID_HEADER_TYPE],
                                        (const char*) "FileHeader::getEntry",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/************************************************************************
*
*
```

Copyright © 1993, 1995 Motorola, Inc.

Appendix
-18-

```
* Function:   getTextBase
*
* Description: Return the base of the text section in the auxiliary header.
*
***************************************************************************
/ inline UInt32 FileHeader::getTextBase              (void) const
{
        if (headerType == COFF_OPT_HEADER) {
                return textBase;
        } else {
                /* Error Condition. */
                ErrInfoerror(STRUCT_LIB, STRUCT_ERRORS[STRUCT_INVALID_HEADER_TYPE],
                                        (const char*) "FileHeader::getTextBase",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};

/***************************************************************************
*
*
* Function:   getDataBase
*
* Description: Return the base of the data section in the auxiliary header.
*
***************************************************************************
/ inline UInt32 FileHeader::getDataBase              (void) const
{
        if (headerType == COFF_OPT_HEADER) {
                return dataBase;
        } else {
                /* Error Condition. */
                ErrInfoerror(STRUCT_LIB, STRUCT_ERRORS[STRUCT_INVALID_HEADER_TYPE],
                                        (const char*) "FileHeader::getDataBase",
                                        ErrInfo::ERR_ERROR,
                                        STRUCT_CONTEXT_ERROR,
                                        __FILE__,
                                        __LINE__);
                errHandle(error, ERR_PUT);
                return 0;
        }
};
```

Copyright © 1993, 1995 Motorola, Inc.

Appendix
-19-

```
/************************************************************************
*
*
* Function:   setOptMagicNumber
*
* Description: Set the magic number in the auxiliary header.
*
*************************************************************************
/ inline void    FileHeader::setOptMagicNumber(const UINT16 val)
{
        if (headerType == COFF_OPT_HEADER) {
                optMagicNumber = val;
        } else {
                /* Error Condition. */
                ErrInfo error(STRUCT_LIB, STRUCT_ERRORS[STRUCT_INVALID_HEADER_TYPE],
                                        (const char*) "FileHeader::setOptMagicNumber",
                                        ErrInfo::ERR_ERROR,
                                        STRUCT_CONTEXT_ERROR,
                                        __FILE__,
                                        __LINE__);
                errHandle(error, ERR_PUT);
                optMagicNumber = 0;
        }
};

/************************************************************************
*
*
* Function:   setVersionStamp
*
* Description: Set the version stamp in the auxiliary header.
*
*************************************************************************
/ inline void    FileHeader::setVersionStamp(const UINT16 val)
{
        if (headerType == COFF_OPT_HEADER) {
                versionStamp = val;
        } else {
                /* Error Condition. */
                ErrInfo error(STRUCT_LIB, STRUCT_ERRORS[STRUCT_INVALID_HEADER_TYPE],
                                        (const char*) "FileHeader::setVersionStamp",
                                        ErrInfo::ERR_ERROR,
                                        STRUCT_CONTEXT_ERROR,
                                        __FILE__,
```

Copyright © 1993, 1995 Motorola, Inc.

Appendix
-20-

```
                                            __LINE__);
            errHandle(error, ERR_PUT);
            versionStamp = 0;
     }
};

/************************************************************************
*
*
* Function:    setTextSize
*
* Description: Set the text size in the auxiliary header.
*
************************************************************************
/ inline void    FileHeader::setTextSize(const UINT32 val)
{
     if (headerType == COFF_OPT_HEADER) {
            textSize = val;
     } else {
            /* Error Condition. */
            ErrInfoerror(STRUCT_LIB, STRUCT_ERRORS[STRUCT_INVALID_HEADER_TYPE],
                                         (const char*) "FileHeader::setTextSize",
                                         ErrInfo::ERR_ERROR,
                                         STRUCT_CONTEXT_ERROR,
                                         __FILE__,
                                         __LINE__);
            errHandle(error, ERR_PUT);
            textSize = 0;
     }
};

/************************************************************************
*
*
* Function:    setDataSize
*
* Description: Set the data size field in the auxiliary header.
*
************************************************************************
/ inline void    FileHeader::setDataSize(const UINT32 val)
{
     if (headerType == COFF_OPT_HEADER) {
            dataSize = val;
     } else {
            /* Error Condition. */
            ErrInfoerror(STRUCT_LIB,

STRUCT_ERRORS[STRUCT_INVALID_HEADER_TYPE],
```

Copyright © 1993, 1995 Motorola, Inc.

Appendix
-21-

```
                                        (const char*) "FileHeader::setDataSize",
                                        ErrInfo::ERR_ERROR,
                                        STRUCT_CONTEXT_ERROR,
                                        __FILE__,
                                        __LINE__);
                errHandle(error, ERR_PUT);
                dataSize         =     0;
        }
};

/***********************************************************************
*
*
* Function:    setBssSize
*
* Description: Set the bss size field in the auxiliary header.
*
***********************************************************************
/ inline void     FileHeader::setBssSize(const UINT32 val)
{
        if (headerType == COFF_OPT_HEADER) {
                bssSize = val;
        } else {
                /* Error Condition. */
                ErrInfoerror(STRUCT_LIB, STRUCT_ERRORS[STRUCT_INVALID_HEADER_TYPE],
                                        (const char*) "FileHeader::setBssSize",
                                        ErrInfo::ERR_ERROR,
                                        STRUCT_CONTEXT_ERROR,
                                        __FILE__,
                                        __LINE__);
                errHandle(error, ERR_PUT);
                bssSize = 0;
        }
};

/***********************************************************************
*
*
* Function:    setEntry
*
* Description: Set the entry point in the auxiliary header.
*
***********************************************************************
/ inline void     FileHeader::setEntry(const UINT32 val)
{
        if (headerType == COFF_OPT_HEADER) {
                entry = val;
        } else {
```

Copyright © 1993, 1995 Motorola, Inc.

Appendix
-22-

```
          /* Error Condition. */
          ErrInfoerror(STRUCT_LIB,

STRUCT_ERRORS[STRUCT_INVALID_HEADER_TYPE],
                              (const char*) "FileHeader::setEntry",
                              ErrInfo::ERR_ERROR,
                              STRUCT_CONTEXT_ERROR,
                              __FILE__,
                              __LINE__);
          errHandle(error, ERR_PUT);
          entry                      =     0;
     }
};

/****************************************************************************
*
*
* Function:   setTextBase
*
* Description: Set the text base address in the auxiliary header.
*
****************************************************************************
/ inline void    FileHeader::setTextBase(const UINT32 val)
{
     if (headerType == COFF_OPT_HEADER) {
          textBase = val;
     } else {
          /* Error Condition. */
          ErrInfoerror(STRUCT_LIB, STRUCT_ERRORS[STRUCT_INVALID_HEADER_TYPE],
                              (const char*) "FileHeader::setTextBase",
                              ErrInfo::ERR_ERROR,
                              STRUCT_CONTEXT_ERROR,
                              __FILE__,
                              __LINE__);
          errHandle(error, ERR_PUT);
          textBase                   =     0;
     }
};

/****************************************************************************
*
*
* Function:   setDataBase
*
* Description: Set the data base address in the auxiliary header.
*
****************************************************************************
/
```

Copyright © 1993, 1995 Motorola, Inc.

Appendix
-23-

```
inline void    FileHeader::setDataBase(const UINT32 val)
{
       if (headerType == COFF_OPT_HEADER) {
              dataBase = val;
       } else {
              /* Error Condition. */
              ErrInfoerror(STRUCT_LIB, STRUCT_ERRORS[STRUCT_INVALID_HEADER_TYPE],
                                          (const char*) "FileHeader::setDataBase",
                                          ErrInfo::ERR_ERROR,
                                          STRUCT_CONTEXT_ERROR,
                                          __FILE__,
                                          __LINE__);
              errHandle(error, ERR_PUT);
              dataBase              =       0;
       }
};

#endif // FILEHDR_HXX
```

```
/******************************************************************
*
*
*      COPYRIGHT (c) 1993 MOTOROLA INC.
*      ALL RIGHTS RESERVED
*
*      The code is the property of Sector Technology and is Motorola
*      Confidential Proprietary Information.
*
*      The copyright notice above does not evidence any
*      actual or intended publication of such source code.
*
* Filename:    $Source: /usr/msa/vault/cvsroot/libsrc/objrw/reader/src/icoff.cxx,v $
* Author:      $Author: aweiner $
* Locker:      $Locker:  $
* State:       $State: Exp $
* Revision:    $Revision: 5.18 $
*
* History:     Issue RLOG command against the RCS version of this file
*              to view revision history and lock status.
*
* Description: Contains the member function definitions for class InCOFF.
*              Class InCOFF is the object file reader for COFF files.
```

Copyright © 1993, 1995 Motorola, Inc.

Appendix
-24-

```
*
* Notes:    This file was written prior to the establishment of an MSA s
*           standard for C++ and does not follow the standard conventins.
*
*************************************************************************
/ static char rcs_icoff_cxx[] = "$RCSfile: icoff.cxx,v $ $Revision: 5.18 $"; /* RCS identifiers */
inline char* get_rcs_icoff_cxx(void) { return rcs_icoff_cxx; } include    <string.h> include    "objread.hxx"

/*************************************************************************
*
*
* Function:   InCOFF
*
* Description: Constuctor for class InCOFF.
*
* Notes:
*
*************************************************************************
/

InCOFF :: InCOFF (const char* fileName, const char* archive,
            Endianness fileEndian, Endianness procEndian,
            HostSize size, UINT32     baseSeek):
InObj (fileName, archive, fileEndian, procEndian, size, baseSeek),  // Construct the base object
file handler.
archInd(FALSE),
timeDate(0),
symSeekAddress(0),
stringSeekAddress(0),
sizeOptional(0),
fileFlags(0),
sectSeekAddress(0)
{
        initialize();
};

/*************************************************************************
*
*
* Function:   initialize
*
* Description: Initialize the reader from the file header and auxiliary file
*             header.
*
* Notes:
*
```

Copyright © 1993, 1995 Motorola, Inc.

Appendix
-25-

***********************************************************************
/

```
void InCOFF::initialize(void)
{
        UINT16      inputBuffer=0;//    Used for temporary storage while reading.

// Check to insure the InObj was constructed correctly.
        if (!inFile.good ()) {
                /* Error Condition. */
                ErrInfo error(OBJ_FILE_READER,
                                READER_ERRORS[READER_FILE_OPEN_FAILURE],
                                (const char*) "InCOFF::InCOFF",
                                ErrInfo::ERR_ERROR,
                                READER_SYSTEM_ERROR,
                                __FILE__,
                                __LINE__);
                errHandle(error, ERR_PUT);
                return;
        } else {

// Set the flavor to COFF.
                flavor = COFF;

//      Reset the current symbol index so getNextSymbol will work.
                curSymIndex = 0;

// Seek to the beginning of the file.
                inFile.seekg (baseSeekAddress, MSA_SEEK_BEG);
                if (inFile.eof ()) {
                        /*      Error Condition.        */
                        ErrInfo error(OBJ_FILE_READER, READER_ERRORS[READER_PREMATURE_EOF],
                                (const char*) "InCOFF::InCOFF",
                                ErrInfo::ERR_ERROR,
                                READER_SYSTEM_ERROR,
                                __FILE__,
                                __LINE__);
                        errHandle(error, ERR_PUT);
                        return;
                } else try {

// Get the magic number.
                        inFile >> inputBuffer;
                        magicNumber = 0;
                        magicNumber = (UINT16) inputBuffer;

// Get the number of sections.
                        inFile >> numSections;

// Get the time/date stamp.
                        inFile >> timeDate;
```

Copyright © 1993, 1995 Motorola, Inc.

Appendix
-26-

```
// Get the symbol table seek address.
inFile >> symSeekAddress;

// Get the number of symbols.
inFile >> numSymbols;

// Get the size of the optional header.
inFile >> inputBuffer;
sizeOptional = 0;
sizeOptional = (UINT16) inputBuffer;

// Compute the section header table seek address.
sectSeekAddress = baseSeekAddress + sizeOptional + FILE_HDR_SIZE;

// Compute the string table seek address.
stringSeekAddress = symSeekAddress + numSymbols * SYMBOL_SIZE;

// Get the file flags.
inFile >> fileFlags;

// Set flags from file flags.

// Set the executable flag.
executable = (Boolean) (fileFlags & FLAG_MASK_EXEC);

// Set the relocStripped flag.
relocStripped = (Boolean) (fileFlags & FLAG_MASK_REL);

// Set the lineStripped flag.
lineStripped = (Boolean) (fileFlags & FLAG_MASK_LNNO);

// Set the symStripped flag.
symStripped = (Boolean) (fileFlags & FLAG_MASK_SYMS);

//      Set the architecture independent COFF flag.
archInd = (Boolean) !(fileFlags & FLAG_MASK_ARCH_IND);

// Get the start address if applicable.
if (sizeOptional) {
        inFile.seekg(ENTRY_POINT_SEEK_ADDRESS, MSA_SEEK_BEG);

if (inFile.eof ()) {
                /* Error Condition. */
                ErrInfo error(OBJ_FILE_READER,
                    READER_ERRORS[READER_PREMATURE_EOF],
                                (const char*) "InCOFF::InCOFF",
                                ErrInfo::ERR_ERROR,
                                READER_SYSTEM_ERROR,
                                __FILE__,
                                __LINE__);
                errHandle(error, ERR_PUT);
        } else {
                inFile >> entryPoint;
```

Copyright © 1993, 1995 Motorola, Inc.

Appendix
-27-

```
                }
            }
        } catch (const MReaderCrash &crash) {
            /*      Error Condition.       */
                ErrInfoerror(OBJ_FILE_READER,
    READER_ERRORS[READER_INVALID_READER],
                            (const char*) "InCOFF::InCOFF",
                            ErrInfo::ERR_ERROR,
                            READER_SYSTEM_ERROR,
                            __FILE__,
                            __LINE__);
            errHandle(error, ERR_PUT);
            crash.shutup();      //      Shut up compiler warnings.
        }
    }
}

/***********************************************************************
 *
 *
 * Function:    ~InCOFF
 *
 * Description: Destructor for class InCOFF.
 *
 * Notes:
 *
 ***********************************************************************
/

InCOFF :: ~InCOFF ()
{
    // Nothing to do.
    // No data needs to be freed, and inFile is closed by ~InObj.
}

/***********************************************************************
 *
 *
 * Function:    sectionHeaderRead
 *
 * Description: Reads in a section header.
 *
 * Notes:
 *
 ***********************************************************************
/

Section*    InCOFF :: sectionHeaderRead (UINT32 index)
{
    UINT16      i=0;            // A counter.
    CHAR*       name=NULL;      // Used to read in the section name.

UINT32      udata32=0;      // Used to read in 4 bytes.
```

Copyright © 1993, 1995 Motorola, Inc.

Appendix
-28-

```
UINT16      udata16=0;      // Used to read in 2 bytes.

// Used to read in the section header. Will be returned.
Section* section=NULL;

// The offset to the beginning of the section.
UINT32      offset=0;

// Check range of index.
if ((index == 0) || (index > numSections)) {
        /* Error Condition. */
        ErrInfo error(OBJ_FILE_READER, READER_ERRORS[READER_INDEX_OUT_OF_BOUNDS],
                        (const char*) "InCOFF::sectionHeaderRead",
                        ErrInfo::ERR_ERROR,
                        READER_CONTEXT_ERROR,
                        __FILE__,
                        __LINE__);
        errHandle(error, ERR_PUT);
        return NULL;
}

// Instantiate section.
section = new Section;

// Calculate the offset to the beginning of the section.
offset = baseSeekAddress + sectSeekAddress + (index - 1) * SECT_HEAD_SIZE;

// Seek to the beginning of the section.
inFile.seekg (offset, MSA_SEEK_BEG);
try {

// Begin reading in the section header.

// Read in the section name.
        name = new CHAR [COFF_SECTION_NAME_SIZE+1];

for (i=0; i<COFF_SECTION_NAME_SIZE; i++) {
                inFile >> name [i];
        }
        name[i] = '\0';

section -> allocName (COFF_SECTION_NAME_SIZE);
        section -> setName (name);

// Read in the address.
        inFile >> udata32;
        section -> setPhysicalAddress (udata32);

// Read in the virtual address.
        inFile >> udata32;
        section -> setVirtualAddress  (udata32);
```

Copyright © 1993, 1995 Motorola, Inc.

Appendix
-29-

```
// Set the section number.
section -> setSectNumber (index);

// Read in the section size.
inFile >> udata32;
section -> setSectSize  (udata32);

// Read in the section data seek address.
inFile >> udata32;
section -> setSectDataSeekAddress    (udata32);

// Read in the relocation seek address.
inFile >> udata32;
section -> setRelocSeekAddress      (udata32);

// Read in the line number entry seek address.
inFile >> udata32;
section -> setLineSeekAddress        (udata32);

// Read in the number of relocation entries.
inFile >> udata16;
section -> setNumRelocs ((UINT32) udata16);

// Read in the number of line number entries.
inFile >> udata16;
section -> setNumLines ((UINT32) udata16);

// Read in the section flags.
inFile >> udata32;
section -> setFlags     (udata32);

// Set the section type.
section -> setType ((SectionType) (section -> getFlags () &
COFF_SECTION_TYPE_MASK));

if (((((section -> getType () & BSS) >> 2) & ((section -> getType () & DATA) >>
1))   ||
                (((section -> getType () & BSS) >> 2) & (section -> getType () & TEXT))
        ||
                (((section -> getType () & DATA) >> 1) & (section -> getType () &
TEXT))) {

/* Error Condition. */
            ErrInfoerror(OBJ_FILE_READER,

READER_ERRORS[READER_INVALID_SECTION_FLAGS],
                        (const char*) "InCOFF::sectionHeaderRead",
                        ErrInfo::ERR_ERROR,
                        READER_CONTEXT_ERROR,
                        __FILE__,
                        __LINE__);
            errHandle(error, ERR_PUT);
        }
```

Copyright © 1993, 1995 Motorola, Inc.

Appendix
-30-

```
        // Set the section attributes.
        section -> setAttribs ((section -> getType () &
COFF_SECTION_NORESERVE_ATTRIB)
                        & (section -> getType () &
COFF_SECTION_NOLOAD_ATTRIB)
                        & (section -> getType () &
COFF_SECTION_NOBIND_ATTRIB));

// Initialize the number of symbols for the section to 0.
        section -> setNumSymbols (0);

// Zero out unused fields.
        section -> setAlignment (0);
        section -> setEntrySize (0);
        section -> setRegionSize (0);
        section -> setRegionAddress (0);
        section -> setAddrExt (0);

section -> setFileName (fileName);
        section -> setArchiveName (archiveName);
    } catch (const MReaderCrash &crash) {
        /*      Error Condition.        */
        ErrInfo error(OBJ_FILE_READER, READER_ERRORS[READER_INVALID_SECTION_HEADER],
                        (const char*) "InCOFF::sectionHeaderRead",
                        ErrInfo::ERR_ERROR,
                        READER_SYSTEM_ERROR,
                        __FILE__,
                        __LINE__);
        errHandle(error, ERR_PUT);
        crash.shutup();         //      Shut up compiler warnings.
        delete section;
        section = NULL;
    } return section;
}

/**************************************************************************
*
*
* Function:     relocRead
*
* Description: Reads in a relocation entry.
*
* Notes:
*
**************************************************************************
/
Reloc* InCOFF::relocRead(UINT32 index, UINT32 relocSeekAddress)
{
```

Copyright © 1993, 1995 Motorola, Inc.

Appendix
-31-

```cpp
// Used to read in the relocation entry. Will be returned.
Reloc* reloc=NULL;

// The offset to the beginning of the reloc.
UINT32     offset=0;

UINT32     udata32=0;     // Used to read in 4 bytes.
UINT16     udata16=0;     // Used to read in 2 bytes.

// Check for valid relocSeekAddress.
if (relocSeekAddress == 0) {
        /* Error Condition. */
        ErrInfo error(OBJ_FILE_READER,
                      READER_ERRORS[READER_INVALID_PARAMETER],
                      (const char*) "InCOFF::relocRead",
                      ErrInfo::ERR_ERROR,
                      READER_CONTEXT_ERROR,
                      __FILE__,
                      __LINE__);
        errHandle(error, ERR_PUT);
}

// Instantiate the return value.
reloc = new Reloc;

// Calculate the offset to the beginning of the reloc.
offset = baseSeekAddress + relocSeekAddress + index * RELOC_SIZE;

// Seek to the beginning of the reloc.
if (inFile.tellg () != (INT32) offset) {
        inFile.seekg (offset, MSA_SEEK_BEG);
} try {
        // Begin reading in the relocation entry.

// Read in address.
        inFile >> udata32;
        reloc -> setAddress (udata32);

// Read in the symbol table index.
        inFile >> udata32;
        reloc -> setSymIndex (udata32);

// Read in type of relocation entry.
        inFile >> udata16;
        reloc -> setType ((UINT32) udata16);

// Initialize the section number.
        reloc -> setSectionNum (0);

// Initialize the symbol pointer.
        reloc -> setSymEntry (NULL);
} catch (const MReaderCrash &crash) {
```

Copyright © 1993, 1995 Motorola, Inc.

Appendix
-32-

```
        /*      Error Condition.      */
        ErrInfo error(OBJ_FILE_READER, READER_ERRORS[READER_INVALID_RELOC_ENTRY],
                        (const char*) "InCOFF::relocRead",
                        ErrInfo::ERR_ERROR,
                        READER_SYSTEM_ERROR,
                        __FILE__,
                        __LINE__);
            errHandle(error, ERR_PUT);
            crash.shutup();       //      Shut up compiler warnings.
            delete reloc;
            reloc = NULL;
        } return reloc;
}
/**********************************************************************
*
*
*       COPYRIGHT (c) 1993 MOTOROLA INC.
*       ALL RIGHTS RESERVED
*
*       The code is the property of Sector Technology and is Motorola
*       Confidential Proprietary Information.
*
*       The copyright notice above does not evidence any
*       actual or intended publication of such source code.
*
* Filename:     $Source: /usr/msa/vault/cvsroot/inc/icoff.hxx,v $
* Author:       $Author: aweiner $
* Locker:       $Locker: $
* State:        $State: Exp $
* Revision:     $Revision: 5.4 $
*
* History:      Issue RLOG command against the RCS version of this file
*               to view revision history and lock status.
*
* Description: Contains the class declaration for class InCOFF.
*              Class InCOFF is the object file reader for COFF files.
*
* Notes:       This file was written prior to the establishment of an MSA s
*              standard for C++ and does not follow the standard conventins.
*
**********************************************************************
/ ifndef MSA_ICOFF_HXX
define MSA_ICOFF_HXX static char rcs_icoff_hxx[] = "$RCSfile: icoff.hxx,v $ $Revision: 5.4 $"; /* RCS identifiers */ include        "objread.hxx"
```

Copyright © 1993, 1995 Motorola, Inc.

Appendix
-33-

////////////////////////////////////////////////////////////

```
class InCOFF : virtual public InObj
{
protected:      // Protected Data

// Input stream from the object file.  Inherited from InObj.
        InObj :: inFile;

//      The name of an archive file.
        InObj :: archiveName;

// The name of the object file.
        InObj :: fileName;

// Flag used to indicate the object file format.
        // Inherited from InObj.
        InObj :: flavor;

// Flag to hold the endianness of the file.
        InObj :: fileEndianness;

// Flag to hold the endianness of the processor.
        InObj :: procEndianness;

// Word size of the host processor where the file was written.
        InObj :: hostSize;

//      The base seek address for the file.
        //      For use with an archiver.
        InObj ::        baseSeekAddress;

// The magic number of the target processor.
        InObj ::        magicNumber;

// The number of sections in the file.
        InObj ::        numSections;

// The number of symbols in the symbol table.
        InObj ::        numSymbols;

// The entry point for the program.
        InObj ::        entryPoint;

// The index of the next symbol to be read in.
        InObj :: curSymIndex;

private:        // Private data.

// Flag to indicate backward compatible COFF is necessary.
        // Backward compatable COFF uses 32 bit little endian with
```

Copyright © 1993, 1995 Motorola, Inc.

Appendix
-34-

```
// the section data written in 16 bit words.
Boolean      archInd;

// The time/date stamp of the file.
INT32        timeDate;

// The symbol table seek address.
// An offset from te beginning of the file to the 1st symbol.
UINT32       symSeekAddress;

// The string table seek address.
// An offset from te beginning of the file to the 1st string in the string table.
UINT32       stringSeekAddress;

// The size of the optional header.
UINT16       sizeOptional;

// The file flags (as read in from the file.)
UINT16       fileFlags;

// The section header table seek address.
// An offset from the beginning of the file to the 1st section header.
UINT32       sectSeekAddress;

public:       // Public member functions.

InCOFF (const char* fileName, const char* archive,
            Endianness fileEndian, Endianness procEndian,
            HostSize size, UINT32 baseSeek=0);        // The constructor for InCOFF.

~InCOFF()    ;   // The destructor for InCOFF.

//    Initialize the reader from the file header.
    void initialize(void);

// Routines for reading standard data objects.
    FileHeader* fileHeaderRead    (void);                  // Read a file header.
    Section*    sectionHeaderRead (UINT32);                // Read a section header.
    Reloc*      relocRead         (UINT32, UINT32);        // Read a relocation entry.
    Line*       lineRead          (UINT32, UINT32);        // Read a line number entry.
    Symbol*     symbolRead        (UINT32);                // Read a symbol.
    Symbol*     nextSymbolRead    (void);                  // Read the next symbol.
    UCHAR*      sectionDataRead   (UINT32, UINT32);        // Read the section contents.
};

#endif // MSA_ICOFF_HXX
```

Copyright © 1993, 1995 Motorola, Inc.

Appendix
-35-

```
/************************************************************************
**
*
*       COPYRIGHT (c) 1993 MOTOROLA INC.
*       ALL RIGHTS RESERVED
*
*       The code is the property of Sector Technology and is Motorola
*       Confidential Proprietary Information.
*
*       The copyright notice above does not evidence any
*       actual or intended publication of such source code.
*
* Filename:     $Source: /usr/msa/vault/cvsroot/inc/iendfile.hxx,v $
* Author:       $Author: davidw $
* Locker:       $Locker: $
* State:        $State: Exp $
* Revision:     $Revision: 5.7 $
*
* History:      Issue RLOG command against the RCS version of this file
*               to view revision history and lock status.
*
* Description:  Contains the class declaration for class InEndianFile.
*               Class InEndianFile contains low level file I/O routines.
*
* Notes:
*
*************************************************************************
*/ ifndef IENDFILE_HXX
define IENDFILE_HXX static char rcs_iendfile_hxx[] = "$RCSfile: iendfile.hxx,v $ $Revision: 5.7 $"; /* RCS identifiers
*/ include        "objread.hxx"

// A macro used to construct the ifstream for different compilers.
#if
defined(__BCPLUSPLUS__)||defined(__WATCOMC__)||defined(__MSDOS__)||defined(_MSC_VER)
#       define INFILE(filename)    inFile(fileName, (ios::binary|ios::in|ios::nocreate))
#else
#       define INFILE(filename)    inFile(fileName, ios::in)
#endif // __BCPLUSPLUS__

// A macro used to open the ifstream for different compilers.
#if
defined(__BCPLUSPLUS__)||defined(__WATCOMC__)||defined(__MSDOS__)||defined(_MSC_VER)
```

Copyright © 1993, 1995 Motorola, Inc.

Appendix
-36-

```
#       define INFILE_OPEN(fileName)        inFile.open(fileName,
(ios::binary|ios::in|ios::nocreate))
#else
#       define INFILE_OPEN(fileName)        inFile.open(fileName, ios::in)
endif // __BCPLUSPLUS__ class InEndianFile
{ private: // Private Data

Endianness      fileEndianness;     // Flag to hold the endianness of the file.

Endianness      procEndianness;     // Flag to hold the endianness of the
processor.

HostSize        hostSize;   // Word size of the host processor where the file was written.

ifstream        inFile;  // Input stream from the object file.  Inherited from InObj.

public:
        ifstream*       getStream (void) { return( &inFile ); } public:         // Public member functions.

// The constructor for InCOFF.
        InEndianFile (const char* fileName, const char* archiveName,
                        Endianness fileEndian, Endianness procEndian, HostSize size);

// The destructor for InCOFF.
        ~InEndianFile ();

// Endian friendly byte data readers.  Inherited from InObj.
        void operator>>       (UINT32&) throw(MReaderCrash);  // Read a unsigned 32 bit
longword.
        void operator>>       (INT32&) throw(MReaderCrash);   // Read a 32 bit longword.
        void operator>>       (UINT16&) throw(MReaderCrash);  // Read a unsigned 16 bit
word.
        void operator>>       (INT16&) throw(MReaderCrash);   // Read a 16 bit word.
        void operator>>       (UCHAR&) throw(MReaderCrash);   // Read a unsigned character.
        void operator>>       (CHAR&) throw(MReaderCrash);           // Read a unsigned
character.

// Block read wrappers (endian independent by nature).
        void            read( char *buffer, int size )
        {       inFile.read( buffer, size );    }

// File manipulation Routines.
        Boolean         eof         (void) { return (Boolean) inFile.eof (); }
        Boolean         good        (void) { return (Boolean) inFile.good (); }
        Boolean         bad         (void) { return (Boolean) inFile.bad (); }
        Boolean         openned     (void) { return (Boolean) inFile.good (); }
        void    seekg       (streampos, SeekDir = MSA_SEEK_BEG);
```

Copyright © 1993, 1995 Motorola, Inc.

Appendix
-37-

```
    int             gcount  (void) { return( inFile.gcount() ); }
    streampos   tellg   (void);
    void        clear   (int state = ios::goodbit) { inFile.clear( state ); }
    int                 operator!    () const { return( !inFile ); }
    void        open    (const char *fileName,
                                int mode = (ios::in | ios::binary))
    {       INFILE_OPEN( fileName );  }
    void            close   (void);
    void            setFileEndianness( Endianness newEndianness )
    {       fileEndianness = newEndianness;          }
};

#endif // IENDFILE_HXX

/***********************************************************************
*
*
*       COPYRIGHT (c) 1993 MOTOROLA INC.
*       ALL RIGHTS RESERVED
*
*       The code is the property of Sector Technology and is Motorola
*       Confidential Proprietary Information.
*
*       The copyright notice above does not evidence any
*       actual or intended publication of such source code.
*
* Filename:     $Source: /usr/msa/vault/cvsroot/libsrc/objrw/reader/src/iobj.cxx,v $
* Author:       $Author: davidw $
* Locker:       $Locker: $
* State:        $State: Exp $
* Revision:     $Revision: 5.15 $
*
* History:      Issue RLOG command against the RCS version of this file
*               to view revision history and lock status.
*
* Description:  Contains the member functions for class InObj.
*
* Functions:    InObj
*               ~InObj
*
* Notes:        This file was written prior to the establishment of an MSA s
*               standard for C++ and does not follow the standard conventins.
*
***********************************************************************
/ static char rcs_iobj_cxx[] = "$RCSfile: iobj.cxx,v $ $Revision: 5.15 $"; /* RCS identifiers */ include <string.h>
include "objread.hxx"
```

Copyright © 1993, 1995 Motorola, Inc.

Appendix
-38-

```
/************************************************************************
*
*
* Function:   InObj
*
* Description: Constuctor for class InObj.
*
************************************************************************
/

InObj :: InObj (const char* file, const char* archive,
                    Endianness fileEndian, Endianness procEndian,
                    HostSize size, UINT32 baseSeek):
inFile (file, archive, fileEndian, procEndian, size),    // Construct the endian handling file stream.
fileEndianness (fileEndian),    // Set the file endianness flag.
procEndianness (procEndian),       // Set the processor endianness flag.
hostSize (size),                              // The size of a word in the file.
baseSeekAddress (baseSeek),       //      The base seek address of the file.
curSymIndex (0)                              // Start at the beginning of the symbol table.
{
        UINT32      length;

archiveName = NULL;
        // Check to insure archive name is valid.
        if ((file == NULL) && (archive == NULL)) {
                /* Error Condition. */
                ErrInfoerror(OBJ_FILE_READER,
                              READER_ERRORS[READER_INVALID_FILE_NAME],
                              (const char*) "InObj::InObj",
                              ErrInfo::ERR_ERROR,
                              READER_CONTEXT_ERROR,
                              __FILE__,
                              __LINE__);
                errHandle(error, ERR_PUT);
        } else {

//      Initialize the archive name.
                if (archive != NULL ) {
                        length = strlen (archive);
                        archiveName = new CHAR [length+1];
                        STRCPY (archiveName, archive);
                        archiveName [length] = '\0';
                } else {
                        archiveName = NULL;
                } initialize (file);
        }
} void InObj :: initialize (const char* file)
{
        UINT32      length;
```

Copyright © 1993, 1995 Motorola, Inc.

Appendix
-39-

```
// Check to insure filename is valid.
if (file == NULL && archiveName == NULL) {
        /* Error Condition. */
        ErrInfoerror(OBJ_FILE_READER,
                          READER_ERRORS[READER_INVALID_FILE_NAME],
                          (const char*) "InObj::InObj",
                          ErrInfo::ERR_ERROR,
                          READER_CONTEXT_ERROR,
                          __FILE__,
                          __LINE__);
        errHandle(error, ERR_PUT);
}

//      Initialize the file name.
if (file != NULL) {
        length = strlen (file);
        fileName = new CHAR [length+1];
        STRCPY (fileName, file);
        fileName [length] = '\0';
} else {
        fileName = NULL;
}

// Check to insure the input stream was openned correctly.
if (!inFile.openned ()) {
        /* Error Condition. */
        ErrInfoerror(OBJ_FILE_READER,
                          READER_ERRORS[READER_FILE_OPEN_FAILURE],
                          (const char*) "InObj::InObj",
                          ErrInfo::ERR_ERROR,
                          READER_SYSTEM_ERROR,
                          __FILE__,
                          __LINE__);
        errHandle(error, ERR_PUT);
}
}

/***********************************************************************
*
*
* Function:   ~InObj
*
* Description: Destructor for class InObj.
*
***********************************************************************
/

InObj :: ~InObj ()
{
        if (fileName) {
                delete[] fileName;
                fileName = NULL;
        }
```

Copyright © 1993, 1995 Motorola, Inc.

Appendix
-40-

```
        if (archiveName) {
                delete[] archiveName;
                archiveName = NULL;
        }

// Check to insure the file stream was closed.
        if (inFile.openned ()) {
           inFile.close();
        }
}
/**********************************************************************
*
*
* Function:   getFilename
*
* Description: Make a dynamic copy of the filename and return it.
*
**********************************************************************
/

Char* InObj :: mGetFilename ()
{
        Char *newFilename = new Char[strlen (fileName) + 1];
        strcpy (newFilename, fileName);
        return newFilename;
}
/**********************************************************************
*
*
*       COPYRIGHT (c) 1993 MOTOROLA INC.
*       ALL RIGHTS RESERVED
*
*       The code is the property of Sector Technology and is Motorola
*       Confidential Proprietary Information.
*
*       The copyright notice above does not evidence any
*       actual or intended publication of such source code.
*
* Filename:    $Source: /usr/msa/vault/cvsroot/inc/iobj.hxx,v $
* Author:      $Author: davidw $
* Locker:      $Locker: $
* State:       $State: Exp $
* Revision:    $Revision: 5.9 $
*
* History:     Issue RLOG command against the RCS version of this file
*              to view revision history and lock status.
*
* Description: Contains the class declaration for class InObj.
*
* Functions:   InObj
*              ~InObj
*
```

Copyright © 1993, 1995 Motorola, Inc.

Appendix
-41-

```
* Notes:    This file was written prior to the establishment of an MSA s
*           standard for C++ and does not follow the standard conventins.
*
************************************************************************
/ ifndef MSA_IOBJ_HXX
define  MSA_IOBJ_HXX static char rcs_iobj_hxx[] = "$RCSfile: iobj.hxx,v $ $Revision: 5.9 $"; /* RCS identifiers */ include     "objread.hxx"

class InObj
{ protected:          // Protected data.

CHAR*       archiveName;

CHAR*       fileName;

FileType    flavor;  // Set by the constructor to reflect the format of
                            //      the object file.

// Flag to hold the endianness of the file.
       Endianness       fileEndianness;

// Flag to hold the endianness of the processor.
       Endianness       procEndianness;

UINT32      baseSeekAddress;   //   The base seek address for the file.
                                      //           For use with an archiver.

UINT16      magicNumber; // Set by the constructor to reflect the target processor.

UINT16          numSections;  // The number of sections in the file.

UINT32          numSymbols;   // The number of symbols in the symbol table.

UINT32      entryPoint;    // The entry point for the program.

// The index of the next symbol to be read in.
       UINT32      curSymIndex;

InEndianFile    inFile;  // An input stream from the object file.

// File Flags
            Boolean     relocStripped;      // Relocation Entries have been stripped.
```

Copyright © 1993, 1995 Motorola, Inc.

Appendix
-42-

```
            Boolean     lineStripped;       // Line Number Entries have been stripped.

Boolean     executable;         // File is executable.

Boolean     symStripped;        // Local symbols have been stripped.

HostSize    hostSize;           // Word size of the host processor where the
file was written.

public:  // Protected functions.

// Constructor for class InObj.
        InObj (const char* fileName, const char* archive,
                    Endianness fileEndian, Endianness procEndian,
                    HostSize hostSize, UINT32 baseSeek=0);

public:         // Public functions.

// Destructor for class InObj.
        virtual ~InObj (void);

//      Initialize the reader from the file header.
        virtual void initialize(const char* file);

// Routines for reading standard data objects.
        // Read a file header.
        virtual FileHeader*     fileHeaderRead(void) = 0;

// Read a section header.
        virtual Section*        sectionHeaderRead(UINT32) = 0;

// Read a relocation entry.
        virtual Reloc*          relocRead(UINT32, UINT32) = 0;

// Read a line number entry.
        virtual Line*           lineRead(UINT32, UINT32) {      return NULL;  };

// Read a symbol.
        virtual Symbol*         symbolRead(UINT32) = 0;

// Read the next symbol.
        virtual Symbol*         nextSymbolRead(void) = 0;

// Read the section contents.
        virtual UCHAR*          sectionDataRead(UINT32, UINT32) = 0;

// Select a member in an archive.
        virtual InObj* mSelectFile (const Char*)            { return NULL; }
        virtual InObj* mSelectFile (const UInt32)           { return NULL; }
        virtual InObj* mSelectFileSymbolName (const Char*)  { return NULL; }
```

Copyright © 1993, 1995 Motorola, Inc.

Appendix
-43-

```
// Accessor functions.
    FileType    getFlavor        () { return flavor; }
    UINT16 getMagicNumber () { return magicNumber; }
    UINT16 getNumSections () { return numSections; }
    UINT32 getNumSymbols () { return numSymbols; }
    UINT32 getEntryPoint    () { return entryPoint; }
    UINT32      getCurSymIndex      ()        { return curSymIndex; }
    void   setCurSymIndex     (UInt32 index) { curSymIndex = index; }
    Boolean     fileRelocStripped ()   {    return relocStripped;   }
    Boolean     fileLineStripped ()    {    return lineStripped;    }
    Boolean     fileSymStripped ()     {    return symStripped;     }
    Boolean     fileIsExecutable ()    {    return executable;      }
    virtual Boolean      mFileIsAnArchive(void) const { return FALSE; }    //      Used
                                    //      to verify that the reader is an archive reader.
                                    //      Only overridden by class MInArchive.
    Char*  mGetFilename ();
    UInt32 mGetFileIndex ()    { return 0; }
};

#endif // IOBJ_HXX

/************************************************************************
 *
 *
 *      COPYRIGHT (c) 1993 MOTOROLA INC.
 *      ALL RIGHTS RESERVED
 *
 *      The code is the property of Sector Technology and is Motorola
 *      Confidential Proprietary Information.
 *
 *      The copyright notice above does not evidence any
 *      actual or intended publication of such source code.
 *
 * Filename:   $Source: /usr/msa/vault/cvsroot/libsrc/objrw/writer/src/ocoff.cxx,v $
 * Author:     $Author: aweiner $
 * Locker:     $Locker: $
 * State:      $State: Exp $
 * Revision:   $Revision: 5.10 $
 *
 * History:    Issue RLOG command against the RCS version of this file
 *             to view revision history and lock status.
 *
 * Description: Contains the member function definitions for class OutCOFF.
 *             Class OutCOFF is the object file writer for COFF files.
 *
 * Notes:
 *
 ************************************************************************
 /
```

Copyright © 1993, 1995 Motorola, Inc.

Appendix
-44-

```cpp
static char rcs_ocoff_cxx[] = "$RCSfile: ocoff.cxx,v $ $Revision: 5.10 $"; /* RCS identifiers */ include    <fstream.h>
include    <string.h> include    "objwrite.hxx"

/************************************************************************
*
*
* Function:   OutCOFF
*
* Description: Constuctor for class OutCOFF.  Initialization done from a
*              COFF file header.
*
*************************************************************************
/

OutCOFF :: OutCOFF (const char* fileName, Endianness fileEndian, Endianness procEndian,
                                HostSize size, Boolean newFile, FileHeader* header,
                                UINT32 arch, UINT32 baseSeek):
// Construct the base object file handler.
OutObj (fileName, fileEndian, procEndian, size, newFile, header, arch, baseSeek),
sections(NULL),
dirtySections(NULL),
allSectionsDirty(FALSE),
headersWritable(FALSE),
symSeekAddress(0),
stringSeekAddress(0),
sizeOptional(0),
fileFlags(0),
sectSeekAddress(0),
timeDate(0)
{
    // Check to insure the fileName is valid.
    if (fileName == NULL) {
        /* Error Condition. */
        ErrInfo error(OBJ_FILE_WRITER,
                        WRITER_ERRORS[WRITER_INVALID_FILE_NAME],
                        (const char*) "OutCOFF::OutCOFF",
                        ErrInfo::ERR_ERROR,
                        WRITER_CONTEXT_ERROR,
                        __FILE__,
                        __LINE__);
        errHandle(error, ERR_PUT);
    }

// Check to insure the OutObj was constructed correctly.
    if (!outFile.good ()) {
        /* Error Condition. */
        ErrInfo error(OBJ_FILE_WRITER,
```

Copyright © 1993, 1995 Motorola, Inc.

Appendix
-45-

```
WRITER_ERRORS[WRITER_OUTPUT_STREAM_INVALID],
                (const char*) "OutCOFF::OutCOFF",
                ErrInfo::ERR_ERROR,
                WRITER_SYSTEM_ERROR,
                __FILE__,
                __LINE__);
        errHandle(error, ERR_PUT);
}

// If a file header was provided, use it for initialization.
if (header != NULL) {
        magicNumber    = header -> getMagicNumber ();
        numSections    = header -> getNumSections ();
        timeDate       = header -> getTimeDate      ();
        numSymbols     = header -> getNumSymbols ();
        sizeOptional   = header -> getSizeOptional();
        fileFlags      = header -> getFileFlags     ();

// Set flags from file flags.

// Set the executable flag.
        executable = (Boolean) ((fileFlags >> FLAG_POS_EXEC) & 0x0001);

// Set the relocStripped flag.
        relocStripped = (Boolean) ((fileFlags >> FLAG_POS_REL) & 0x0001);

// Set the lineStripped flag.
        lineStripped = (Boolean) ((fileFlags >> FLAG_POS_LNNO) & 0x0001);

// Set the symStripped flag.
        symStripped = (Boolean) ((fileFlags >> FLAG_POS_SYMS) & 0x0001);

//      If a optional header is provided, initialize it as well.
        if (sizeOptional != 0) {
                FileHeader*    optHeader=header->nextFileHeader;

// Set the header type of the optional header.
                optionalHeader.setHeaderType (COFF_OPT_HEADER);

// Write Out the magic number.
                optionalHeader.setOptMagicNumber (optHeader -> getOptMagicNumber ());

// Write Out the versionStamp;
                optionalHeader.setVersionStamp (optHeader -> getVersionStamp ());

// Write Out the size of the text section.
                optionalHeader.setTextSize (optHeader -> getTextSize ());

// Write Out the size of the data section.
                optionalHeader.setDataSize (optHeader -> getDataSize ());

// Write Out the size of the bss seciton.
```

Copyright © 1993, 1995 Motorola, Inc.

Appendix
-46-

```
                optionalHeader.setBssSize (optHeader -> getBssSize ());

// Write Out the entry point.
                optionalHeader.setEntry (optHeader -> getEntry ());

// Write Out the address of the base of the code.
                optionalHeader.setTextBase (optHeader -> getTextBase ());

// Write Out the address of the base of the data.
                optionalHeader.setDataBase (optHeader -> getDataBase ());
        }
    }

// Instantiate the sections array.
    sections = new Section [numSections+1];

// Instantiate the array of dirty section flags.
    dirtySections = new Boolean [numSections+1];

// Allocate space for the section name in each header.
    // Initialize each dirtySection to clean.
    for (INT32 i=1; i<numSections; i++) {
            sections[i].allocName(COFF_SECTION_NAME_SIZE);
            dirtySections[i] = newFile;
    }

// If the file is a new file, make all sections dirty.
    allSectionsDirty = newFile;

// Allow headers to be written.
    headersWritable = TRUE;
}
/*************************************************************************
*
*
* Function:   ~OutCOFF
*
* Description: Destructor for class OutCOFF.  Needs to write out the string
*              table before dying.
*
*************************************************************************
/

OutCOFF :: ~OutCOFF ()
{
        // Write out the string table.
        stringTableWrite ();

// Get rid of dynamically allocated stuff.
        delete[] sections;
        delete[] dirtySections;
}
```

Copyright © 1993, 1995 Motorola, Inc.

Appendix
-47-

```
/*****************************************************************
*
*
* Function:    fileHeaderWrite
*
* Description: Writes Out the file header.
*
*****************************************************************
/ void OutCOFF :: fileHeaderWrite (const FileHeader* fileHeader)
{
        // Check for a valid file header.
        if (!fileHeader) {
                /* Error Condition. */
                ErrInfo error(OBJ_FILE_WRITER,
                                WRITER_ERRORS[WRITER_INVALID_PARAMETER],
                                (const char*) "OutCOFF::~OutCOFF",
                                ErrInfo::ERR_ERROR,
                                WRITER_CONTEXT_ERROR,
                                __FILE__,
                                __LINE__);
                errHandle(error, ERR_PUT);
                return;
        }

// Check for section writing permission.
        // If any section data, line entries, reloc entries, or symbols have been
        // written, no more section headers may be written.
        if (!headersWritable) {
                /* Error Condition.   */
                ErrInfo error(OBJ_FILE_WRITER, WRITER_ERRORS[WRITER_HEADERS_NO_LONGER_WRITABLE],
                                (const char*) "OutCOFF::~OutCOFF",
                                ErrInfo::ERR_ERROR,
                                WRITER_CONTEXT_ERROR,
                                __FILE__,
                                __LINE__);
                errHandle(error, ERR_PUT);
                return;
        } if (fileHeader -> getHeaderType () == COFF_FILE_HEADER) {
                // fileHeader is the main file header.

magicNumber    = fileHeader -> getMagicNumber    ();
                numSections    = fileHeader -> getNumSections    ();
                timeDate       = fileHeader -> getTimeDate       ();
                numSymbols     = fileHeader -> getNumSymbols              ();
                sizeOptional   = fileHeader -> getSizeOptional   ();
                fileFlags      = fileHeader -> getFileFlags      ();

// Set flags from file flags.
```

Copyright © 1993, 1995 Motorola, Inc.

Appendix
-48-

```
            // Set the executable flag.
            executable = (Boolean) ((fileFlags >> FLAG_POS_EXEC) & 0x0001);

// Set the relocStripped flag.
            relocStripped = (Boolean) ((fileFlags >> FLAG_POS_REL) & 0x0001);

// Set the lineStripped flag.
            lineStripped = (Boolean) ((fileFlags >> FLAG_POS_LNNO) & 0x0001);

// Set the symStripped flag.
            symStripped = (Boolean) ((fileFlags >> FLAG_POS_SYMS) & 0x0001);

//      Set the architecture independent flag.
            archInd      =      (Boolean) ((fileFlags >> FLAG_POS_ARCH_IND) &
0x0001);

} else if (fileHeader -> getHeaderType () == COFF_OPT_HEADER) {

// fileHeader is an optional header.

// Write Out the magic number.
            optionalHeader.setOptMagicNumber (fileHeader -> getOptMagicNumber ());

// Write Out the versionStamp;
            optionalHeader.setVersionStamp (fileHeader -> getVersionStamp ());

// Write Out the size of the text section.
            optionalHeader.setTextSize (fileHeader -> getTextSize ());

// Write Out the size of the data section.
            optionalHeader.setDataSize (fileHeader -> getDataSize ());

// Write Out the size of the bss seciton.
            optionalHeader.setBssSize (fileHeader -> getBssSize ());

// Write Out the entry point.
            optionalHeader.setEntry (fileHeader -> getEntry ());

// Write Out the address of the base of the code.
            optionalHeader.setTextBase (fileHeader -> getTextBase ());

// Write Out the address of the base of the data.
            optionalHeader.setDataBase (fileHeader -> getDataBase ());
        } else {
            /* Error Condition. */
            ErrInfoerror(OBJ_FILE_WRITER, WRITER_ERRORS[WRITER_INVALID_HEADER_TYPE],
                        (const char*) "OutCOFF::~OutCOFF",
                        ErrInfo::ERR_ERROR,
                        WRITER_CONTEXT_ERROR,
                        __FILE__,
                        __LINE__);
```

Copyright © 1993, 1995 Motorola, Inc.

Appendix
-49-

```
            errHandle(error, ERR_PUT);
    }
}

/************************************************************************
 *
 *
 * Function:    sectionHeaderWrite
 *
 * Description: Writes Out a section header.
 *
 ************************************************************************
/ void    OutCOFF :: sectionHeaderWrite (const Section* section, const INT32 index)
{
        UInt32 attribs=0;       //      The attributes for the section.
        UInt32 flags=0;         //      The flags for the section.

// Check section parameter.
        if (!section) {
                /* Error Condition. */
                ErrInfo error(OBJ_FILE_WRITER,
                            WRITER_ERRORS[WRITER_INVALID_PARAMETER],
                            (const char*) "OutCOFF::sectionHeaderWrite",
                            ErrInfo::ERR_ERROR,
                            WRITER_CONTEXT_ERROR,
                            __FILE__,
                            __LINE__);
                errHandle(error, ERR_PUT);
                return;
        }

// Check range of index.
        if ((index < 1) || (index > numSections)) {
                /* Error Condition. */
                ErrInfo error(OBJ_FILE_WRITER, WRITER_ERRORS[WRITER_INDEX_OUT_OF_BOUNDS],
                            (const char*) "OutCOFF::sectionHeaderWrite",
                            ErrInfo::ERR_ERROR,
                            WRITER_CONTEXT_ERROR,
                            __FILE__,
                            __LINE__);
                errHandle(error, ERR_PUT);
                return;
        }

// Check for section writing permission.
        // If any section data, line entries, reloc entries, or symbols have been
        // written, no more section headers may be written.
        if (!headersWritable) {
                /* Error Condition. */
```

Copyright © 1993, 1995 Motorola, Inc.

Appendix
-50-

```
      ErrInfoerror(OBJ_FILE_WRITER,

WRITER_ERRORS[WRITER_HEADERS_NO_LONGER_WRITABLE],
                        (const char*) "OutCOFF::sectionHeaderWrite",
                        ErrInfo::ERR_ERROR,
                        WRITER_CONTEXT_ERROR,
                        __FILE__,
                        __LINE__);
      errHandle(error, ERR_PUT);
      return;
}

// Set the dirtySections flag.
dirtySections [index] = TRUE;

// Copy each field of the section header.
sections [index].setName                          (section -> getName ());
sections [index].setPhysicalAddress  (section -> getPhysicalAddress ());
sections [index].setVirtualAddress            (section -> getVirtualAddress ());
sections [index].setSectNumber                 (section -> getSectNumber ());
sections [index].setSectSize                       (section -> getSectSize ());
sections [index].setSectDataSeekAddress   (0);
sections [index].setRelocSeekAddress         (0);
sections [index].setLineSeekAddress          (0);
sections [index].setNumRelocs                     (section -> getNumRelocs ());
sections [index].setNumLines                   (section -> getNumLines ());
sections [index].setFlags                          (section -> getFlags ());
sections [index].setType                           (section -> getType ());
sections [index].setAttribs                     (section -> getAttribs ());
sections [index].setNumSymbols                  (section -> getNumSymbols ());

// Zero out unused fields.
sections [index].setAlignment       (0);
sections [index].setEntrySize       (0);
sections [index].setRegionSize      (0);
sections [index].setRegionAddress(0);
sections [index].setAddrExt         (0);

//      Set the section flags to match the COFF semantics.
attribs = section->getAttribs();
flags = section->getFlags();
//      Indicate the section type (BSS, DATA, TEXT).
flags |= section->getType();

//      Add in the noload, nobind, and noreserve flags.
      flags |= ((attribs & (SECT_NOLOAD | SECT_NOBIND | SECT_NORESERVE)) <<
SHIFT_16);

//      Flags have not yet been set. Calculate them.
      if (!(attribs & SECT_NORESERVE) && !(attribs & SECT_NOLOAD)     && !(attribs &
SECT_NOBIND)) {
            //      Section is a regular section.
            flags |= COFF_SECTION_REG_FLAG;
```

Copyright © 1993, 1995 Motorola, Inc.

Appendix
-51-

```
        } else if (!(attribs & SECT_NORESERVE) && (attribs & SECT_NOLOAD)       &&
!(attribs & SECT_NOBIND)) {
                //      Section is a noload section.
                flags |= COFF_SECTION_NOLOAD_FLAG;
        } else if ((attribs & SECT_NORESERVE) && (attribs & SECT_NOLOAD) && (attribs &
SECT_NOBIND)) {
                //      Section is a copy section.
                flags |= COFF_SECTION_COPY_FLAG;
        } else if ((attribs & SECT_NORESERVE) && (attribs & SECT_NOLOAD) && (attribs &
SECT_NOBIND)) {
                //      Section is a comment section.
                flags |= COFF_SECTION_INFO_FLAG;
        } else if ((attribs & SECT_NORESERVE) && !(attribs & SECT_NOLOAD)       &&
!(attribs & SECT_NOBIND)) {
                //      Section is a regular section.
                flags |= COFF_SECTION_OVER_FLAG;
        } sections [index].setFlags(flags);
}

/************************************************************************
*
*
* Function:    relocWrite
*
* Description: Writes Out a relocation entry.
*
*************************************************************************
/
void OutCOFF :: relocWrite (const Reloc* reloc, const UINT32 index, const INT32 sectNum)
{
        // The offset to the beginning of the reloc.
        INT32 offset=0;

// A buffer to help write out casted data.
        UINT16       uInt16Buf=0;

// Check the relocation entry parameter.
        if (!reloc) {
                /* Error Condition. */
                ErrInfo error(OBJ_FILE_WRITER,
                              WRITER_ERRORS[WRITER_INVALID_PARAMETER],
                              (const char*) "OutCOFF::relocWrite",
                              ErrInfo::ERR_ERROR,
                              WRITER_CONTEXT_ERROR,
                              __FILE__,
                              __LINE__);
                errHandle(error, ERR_PUT);
                return;
        }

// Check range of sectNum.
```

Copyright © 1993, 1995 Motorola, Inc.

Appendix
-52-

```
if ((sectNum < 1) || (sectNum > numSections)) {
        /* Error Conditions. */
        ErrInfo error(OBJ_FILE_WRITER, WRITER_ERRORS[WRITER_INDEX_OUT_OF_BOUNDS],
                        (const char*) "OutCOFF::relocWrite",
                        ErrInfo::ERR_ERROR,
                        WRITER_CONTEXT_ERROR,
                        __FILE__,
                        __LINE__);
        errHandle(error, ERR_PUT);
        return;
}

// Check range of index.
if (index > sections [sectNum].getNumRelocs ()) {
        /* Error Conditions. */
        ErrInfo error(OBJ_FILE_WRITER, WRITER_ERRORS[WRITER_INDEX_OUT_OF_BOUNDS],
                        (const char*) "OutCOFF::relocWrite",
                        ErrInfo::ERR_ERROR,
                        WRITER_CONTEXT_ERROR,
                        __FILE__,
                        __LINE__);
        errHandle(error, ERR_PUT);
        return;
}

//      Make sure all section headers have been written and no more can be.
if (headersWritable) {
        // Calculate all of the file seek addresses in each header.
        calcSeekAddresses ();
}

// Calculate the offset to the beginning of the reloc.
offset = baseSeekAddress + sections [sectNum].getRelocSeekAddress ()
                + index * RELOC_SIZE;

// Seek to the beginning of the reloc.
if (outFile.tellp () != offset) {
        outFile.seekp (offset, MSA_SEEK_BEG);
        if (!outFile.good() || (outFile.tellp () != offset)) {
                /* Error Condition. */
                ErrInfo error(OBJ_FILE_WRITER, WRITER_ERRORS[WRITER_FILE_SEEK_FAILURE],
                        (const char*) "OutCOFF::relocWrite",
                        ErrInfo::ERR_ERROR,
                        WRITER_SYSTEM_ERROR,
                        __FILE__,
                        __LINE__);
                errHandle(error, ERR_PUT);
                return;
```

Copyright © 1993, 1995 Motorola, Inc.

Appendix
-53-

```
                }
        }

// Begin writing the relocation entry.
        try {
                // Write Out address.
                outFile << reloc -> getAddress ();

// Write Out the symbol table index.
                outFile << reloc -> getSymIndex ();

// Write Out type of relocation entry.
                uInt16Buf = (UINT16) reloc -> getType ();
                outFile << uInt16Buf;
        } catch (const MWriterCrash& crash) {
                crash.shutup();         //      Shut up the compiler.
        }
}

/***********************************************************************
*
*
* Function:     lineWrite
*
* Description:  Writes Out a line number entry.
*
***********************************************************************
/ void    OutCOFF :: lineWrite (const Line* line, const UINT32 index, const INT32 sectNum)
{
        // The offset to the beginning of the line number entry.
        INT32 offset=0;

// A buffer to help Write Out casted data.
        UINT16          uInt16Buf=0;

// Check for valid line entry.
        if (!line) {
                /* Error Condition. */
                ErrInfoerror(OBJ_FILE_WRITER,
                                WRITER_ERRORS[WRITER_INVALID_PARAMETER],
                                (const char*) "OutCOFF::lineWrite",
                                ErrInfo::ERR_ERROR,
                                WRITER_CONTEXT_ERROR,
                                __FILE__,
                                __LINE__);
                errHandle(error, ERR_PUT);
                return;
        }
```

Copyright © 1993, 1995 Motorola, Inc.

Appendix
-54-

```
// Check range of sectNum.
if ((sectNum < 1) || (sectNum > numSections)) {
        /* Error Condition. */
        ErrInfo error(OBJ_FILE_WRITER, WRITER_ERRORS[WRITER_INDEX_OUT_OF_BOUNDS],
                        (const char*) "OutCOFF::lineWrite",
                        ErrInfo::ERR_ERROR,
                        WRITER_CONTEXT_ERROR,
                        __FILE__,
                        __LINE__);
        errHandle(error, ERR_PUT);
        return;
}

// Check range of index.
if (index > sections [sectNum].getNumLines ()) {
        /* Error Condition. */
        ErrInfo error(OBJ_FILE_WRITER, WRITER_ERRORS[WRITER_INDEX_OUT_OF_BOUNDS],
                        (const char*) "OutCOFF::lineWrite",
                        ErrInfo::ERR_ERROR,
                        WRITER_CONTEXT_ERROR,
                        __FILE__,
                        __LINE__);
        errHandle(error, ERR_PUT);
        return;
}

//      Make sure all section headers have been written and no more can be.
if (headersWritable) {
        // Calculate all of the file seek addresses in each header and print each
        // header.
        calcSeekAddresses ();
}

// Calculate the offset to the beginning of the line number entry.
offset = baseSeekAddress + sections [sectNum].getLineSeekAddress ()
                + index * LINE_SIZE;

// Seek to the beginning of the line.
if (outFile.tellp () != offset) {
        outFile.seekp (offset, MSA_SEEK_BEG);
        if (!outFile.good() || (outFile.tellp () != offset)) {
                /* Error Condition. */
                ErrInfo error(OBJ_FILE_WRITER, WRITER_ERRORS[WRITER_FILE_SEEK_FAILURE],
                        (const char*) "OutCOFF::lineWrite",
                        ErrInfo::ERR_ERROR,
                        WRITER_SYSTEM_ERROR,
                        __FILE__,
                        __LINE__);
```

Copyright © 1993, 1995 Motorola, Inc.

Appendix
-55-

```
            errHandle(error, ERR_PUT);
            return;
        }
    }

// Begin writing in the line number entry.
    try {
            // Write out the offset into the section data and the symbol index.
            if (line->getSrcLine() != 0) {
                    //      A source line entry.
                    outFile << line->getAddress();
            } else {
                    //      A source file name entry.
                    outFile << line->getSymIndex();
            }

// Write Out the source line number.
            uInt16Buf = (UINT16) line -> getSrcLine ();
            outFile << uInt16Buf;
    } catch (const MWriterCrash& crash) {
            crash.shutup();         //      Shut up the compiler.
    }
}

/**********************************************************************
*
*
* Function:    symbolWrite
*
* Description: Writes Out a symbol.
*
**********************************************************************
/ void    OutCOFF :: symbolWrite (const Symbol* symbol, const UINT32 index)
{
        UINT32      i=0;            // A counter.

// The length of the name string.
        UINT32      nameLength=0;

UINT32      udata32=0;      // Used to write out 4 bytes.
        UINT16      udata16=0;      // Used to write out 2 bytes.
        INT32 data32=0;             // Used to write out 4 bytes.
        INT16 data16=0;             // Used to write out 2 bytes.
        UCHAR       uchar8=0;       // Used to write out 1 byte.

CHAR*       name=NULL; //    Used to write out strings.

// The offset to the beginning of the symbol.
        INT32 offset=0;
```

Copyright © 1993, 1995 Motorola, Inc.

Appendix
-56-

```
// Check for a valid symbol.
if (!symbol) {
        /* Error Condition. */
        ErrInfoerror(OBJ_FILE_WRITER,
                        WRITER_ERRORS[WRITER_INVALID_PARAMETER],
                        (const char*) "OutCOFF::symbolWrite",
                        ErrInfo::ERR_ERROR,
                        WRITER_CONTEXT_ERROR,
                        __FILE__,
                        __LINE__);
        errHandle(error, ERR_PUT);
        return;
}

// Check range of the symbol index.
if (index > numSymbols) {
        /* Error Condition. */
        ErrInfoerror(OBJ_FILE_WRITER, WRITER_ERRORS[WRITER_INDEX_OUT_OF_BOUNDS],
                        (const char*) "OutCOFF::symbolWrite",
                        ErrInfo::ERR_ERROR,
                        WRITER_CONTEXT_ERROR,
                        __FILE__,
                        __LINE__);
        errHandle(error, ERR_PUT);
        return;
}

//      Make sure all section headers have been written and no more can be.
if (headersWritable) {
        // Calculate all of the file seek addresses in each header.
        calcSeekAddresses ();
}

// Calculate the offset to the beginning of the symbol.
offset = baseSeekAddress + symSeekAddress + index * SYMBOL_SIZE;

// Seek to the beginning of the symbol.
outFile.seekp (offset, MSA_SEEK_BEG);
if (!outFile.good() || (outFile.tellp () != offset)) {
        /* Error Condition. */
        ErrInfoerror(OBJ_FILE_WRITER,
                        WRITER_ERRORS[WRITER_FILE_SEEK_FAILURE],
                        (const char*) "OutCOFF::symbolWrite",
                        ErrInfo::ERR_ERROR,
                        WRITER_SYSTEM_ERROR,
                        __FILE__,
                        __LINE__);
        errHandle(error, ERR_PUT);
        return;
}
```

Copyright © 1993, 1995 Motorola, Inc.

Appendix
-57-

```
// Begin writing out the symbol.
try {
        name = symbol -> getName ();

nameLength = STRLEN (name);
        if (nameLength <= COFF_NAME_LENGTH) {
                // Write out the symbol name.
                for (i=0; i<COFF_NAME_LENGTH; i++) {
                        if (i<nameLength) {
                                outFile << name [i];
                        } else {
                                outFile << (UCHAR) '\0';
                        }
                }
        } else {
                outFile << (UINT32) 0;
                outFile << (UINT32) (stringTable.getSizeUsed () + 4);

stringTable.addString (name);
        }

// Clean up name.
        delete[] (name);
        name = NULL;

// Write Out symbol value.
        data32 = symbol -> getValue();
        outFile <<     data32;

// Write Out the number of the associated section.
        data16 = (INT16) symbol -> getSectNum ();
        outFile << data16;

// Write Out the type of the symbol.
        udata16 = (UINT16) symbol -> getType ();
        outFile << udata16;

// Write Out the storage class of the symbol.
        uchar8 = (UCHAR) symbol -> getStorClass ();
        outFile << uchar8;

// Write Out the number of auxiliary entries.
        uchar8 = (UCHAR) symbol -> getNumAuxEntries ();
        outFile << uchar8;

// Check for a valid symbol.
        if (symbol -> getNumAuxEntries () != 0) {

// Check range of the symbol index.
                if (index >= numSymbols) {
                        /* Error Condition. */
                        ErrInfo error(OBJ_FILE_WRITER,
```

Copyright © 1993, 1995 Motorola, Inc.

Appendix
-58-

```
WRITER_ERRORS[WRITER_INDEX_OUT_OF_BOUNDS],
                                (const char*) "OutCOFF::symbolWrite",
                                ErrInfo::ERR_ERROR,
                                WRITER_CONTEXT_ERROR,
                                __FILE__,
                                __LINE__);
                errHandle(error, ERR_PUT);
                return;
        }

// Calculate the offset to the beginning of the symbol.
        offset = baseSeekAddress + symSeekAddress + ((index + 1) * SYMBOL_SIZE);

// Seek to the beginning of the symbol.
        outFile.seekp (offset, MSA_SEEK_BEG);
        if (!outFile.good() II (outFile.tellp () != offset)) {
                /* Error Condition. */
                ErrInfoerror(OBJ_FILE_WRITER, WRITER_ERRORS[WRITER_FILE_SEEK_FAILURE],
                                (const char*) "OutCOFF::symbolWrite",
                                ErrInfo::ERR_ERROR,
                                WRITER_CONTEXT_ERROR,
                                __FILE__,
                                __LINE__);
                errHandle(error, ERR_PUT);
                return;
        }

// Begin Writing out the symbol.
        switch (symbol -> getSymbolType ()) {
                case FILENAME_SYMBOL: {

// Zero out unused fields.
                        outFile << (UINT32) 0;

// Write Out the filename.
                        name = symbol -> getFileName ();
                        for (i=0; i<COFF_AUX_FILENAME_LEN; i++) {
                                outFile << name [i];
                        }
                        delete[] name;
                        name = NULL;

break;
                } case SECTION_SYMBOL: {

// Write Out the size of the section.
                        udata32 = symbol -> getSectionLength ();
                        outFile << udata32;
```

Copyright © 1993, 1995 Motorola, Inc.

Appendix
-59-

```
        // Write Out the number of relocation entries.
        udata32 = symbol -> getNumRelocs ();
        outFile << udata32;

// Write Out the number of line number entries.
        udata32 = symbol -> getNumLines ();
        outFile << udata32;

// Zero out unused fields.
        outFile << (UINT32) 0;
        outFile << (UINT32) 0;
        outFile << (UINT16) 0;

break;
    }
    case TAG_NAME_SYMBOL: {

// Zero out unused fields.
        outFile << (UINT32) 0;
        outFile << (UINT16) 0;

// Write Out the object size.
        udata16 = symbol -> getObjSize ();
        outFile << udata16;

// Zero out unused fields.
        outFile << (UINT32) 0;

// Write Out the end index.
        udata32 = symbol -> getEndOfIndex ();
        outFile << udata32;

// Zero out unused fields.
        outFile << (UINT16) 0;

break;
    }
    case END_OF_STRUCT_SYMBOL: {

// Write Out the tag index.
        udata32 = symbol -> getTagIndex ();
        outFile << udata32;

// Zero out unused fields.
        outFile << (UINT16) 0;

// Write Out the object size.
        udata16 = symbol -> getObjSize ();
        outFile << udata16;

// Zero out unused fields.
```

Copyright © 1993, 1995 Motorola, Inc.

Appendix
-60-

```
            outFile << (UINT32) 0;
            outFile << (UINT32) 0;
            outFile << (UINT16) 0;

break;
    } case FUNC_SYMBOL: {

// Write Out the tag index.
            udata32 = symbol -> getTagIndex ();
            outFile << udata32;

// Write Out the function size.
            udata32 = symbol -> getFuncSize ();
            outFile << udata32;

// Write Out the line number pointer.
            udata16 = symbol -> getLineNumPtr ();
            outFile << udata16;

// Zero out unused fields.
            outFile << (UINT16) 0;

// Write Out the end of index.
            udata32 = symbol -> getEndOfIndex ();
            outFile << udata32;

// Write Out transfer vector index.
            udata16 = symbol -> getTransferVectorIndex ();
            outFile << udata16;

break;
    } case ARRAY_SYMBOL: {

// Write Out the tag index.
            udata32 = symbol -> getTagIndex ();
            outFile << udata32;

// Write Out the line number.
            udata16 = (UINT16) symbol -> getLineNum ();
            outFile << udata16;

// Write Out object size.
            udata16 = symbol -> getObjSize ();
            outFile << udata16;

// Write Out the dimensions.
            for (i=0; i<4; i++) {
                    udata16 = symbol -> getDimension (i);
                    outFile << udata16;
            }
```

Copyright © 1993, 1995 Motorola, Inc.

Appendix
-61-

```
              // Zero out unused fields.
              outFile << (UINT16) 0;

break;
     } case END_OF_BLOCK_SYMBOL: {

// Zero out unused fields.
              outFile << (UINT32) 0;

// Write Out the line number.
              udata16 = (UINT16) symbol -> getLineNum ();
              outFile << udata16;

// Zero out unused fields.
              outFile << (UINT32) 0;
              outFile << (UINT32) 0;
              outFile << (UINT32) 0;

break;
     } case BEG_OF_BLOCK_SYMBOL: {

// Zero out unused fields.
              outFile << (UINT32) 0;

// Write Out the line number.
              udata16 = (UINT16) symbol -> getLineNum ();
              outFile << udata16;

// Zero out unused fields.
              outFile << (UINT32) 0;
              outFile << (UINT16) 0;

// Write Out end index.
              udata32 = symbol -> getEndOfIndex ();
              outFile << udata32;

// Zero out unused fields.
              outFile << (UINT16) 0;

break;
     } case NAME_OF_OBJ_SYMBOL: {

// Write Out the tag index.
              udata32 = symbol -> getTagIndex ();
              outFile << udata32;

// Zero out unused fields.
```

Copyright © 1993, 1995 Motorola, Inc.

Appendix
-62-

```
            outFile << (UINT16) 0;

// Write Out object size.
        udata16 = symbol -> getObjSize ();
        outFile << udata16;

// Zero out unused fields.
        outFile << (UINT32) 0;
        outFile << (UINT32) 0;
        outFile << (UINT16) 0;

break;
    } default: {
        /* Error Condition. */
        ErrInfoerror(OBJ_FILE_WRITER,
                     WRITER_ERRORS[WRITER_INVALID_SYMBOL_TYPE],
                     (const char*) "OutCOFF::symbolWrite",
                     ErrInfo::ERR_ERROR,
                     WRITER_CONTEXT_ERROR,
                     __FILE__,
                     __LINE__);
        errHandle(error, ERR_PUT);
        break;
        }
    }
} catch (const MWriterCrash& crash) {
    crash.shutup();      //    Shut up the compiler.
    }
}

/************************************************************************
 *
 *
 * Function:    nextSymbolWrite
 *
 * Description: Writes Out a symbol.
 *
 ************************************************************************
 / void    OutCOFF :: nextSymbolWrite (const Symbol* symbol)
{
    if (symbol == NULL) {
        /* Error Condition. */
        ErrInfoerror(OBJ_FILE_WRITER,
                     WRITER_ERRORS[WRITER_INVALID_PARAMETER],
```

Copyright © 1993, 1995 Motorola, Inc.

Appendix
-63-

```
                                    (const char*) "OutCOFF::nextSymbolWrite",
                                    ErrInfo::ERR_ERROR,
                                    WRITER_CONTEXT_ERROR,
                                    __FILE__,
                                    __LINE__);
        errHandle(error, ERR_PUT);
        return;
    } symbolWrite (symbol, curSymIndex);

curSymIndex++;
    if (symbol -> getNumAuxEntries () > 0) {
        curSymIndex += symbol -> getNumAuxEntries ();
    }
}

/************************************************************************
 *
 *
 * Function:    sectionDataWrite
 *
 * Description: Writes Out the section's data.
 *
 ************************************************************************
 / void    OutCOFF :: sectionDataWrite (const UCHAR* sectData, const INT32 sectNum, const
UINT32 numBytes)
{
        UINT32      i=0;     // A counter.

UCHAR       swap [2];    // Used to do byte swapping.

INT32 offset=0;      //    Used to calculate the seek address.

// Check parameter.
        if (!sectData) {
            /* Error Condition. */
            ErrInfo error(OBJ_FILE_WRITER,
                                WRITER_ERRORS[WRITER_INVALID_PARAMETER],
                                (const char*) "OutCOFF::sectionDataWrite",
                                ErrInfo::ERR_ERROR,
                                WRITER_CONTEXT_ERROR,
                                __FILE__,
                                __LINE__);
            errHandle(error, ERR_PUT);
            return;
        }

// Check range of sectNum.
        if ((sectNum < 1) || (sectNum > numSections)) {
```

Copyright © 1993, 1995 Motorola, Inc.

Appendix
-64-

```
        /* Error Conditions. */
        ErrInfo error(OBJ_FILE_WRITER,
WRITER_ERRORS[WRITER_INDEX_OUT_OF_BOUNDS],
                        (const char*) "OutCOFF::sectionDataWrite",
                        ErrInfo::ERR_ERROR,
                        WRITER_CONTEXT_ERROR,
                        __FILE__,
                        __LINE__);
        errHandle(error, ERR_PUT);
        return;
}

//      Make sure all section headers have been written and no more can be.
if (headersWritable) {
        // Calculate all of the file seek addresses in each header.
        calcSeekAddresses ();
}

//      Calculate the seek address.
offset =        baseSeekAddress + sections [sectNum].getSectDataSeekAddress ();

// Find the beginning of the section.
outFile.seekp (offset, MSA_SEEK_BEG);
if (!outFile.good() || (outFile.tellp () != offset)) {
        /* Error Condition. */
        ErrInfo error(OBJ_FILE_WRITER,
                        WRITER_ERRORS[WRITER_FILE_SEEK_FAILURE],
                        (const char*) "OutCOFF::sectionDataWrite",
                        ErrInfo::ERR_ERROR,
                        WRITER_SYSTEM_ERROR,
                        __FILE__,
                        __LINE__);
        errHandle(error, ERR_PUT);
        return;
}

//      Write out the section data.
try {
        if (!archInd) {
                // Need to Write out as little endian words using operator << UINT16.
                for (i=0; i<numBytes; i+=2) {
                        if (numBytes > i+1) {
                                // Write two bytes and reverse order.
                                swap [1] = sectData [i];
                                swap [0] = sectData [i+1];
                                outFile << swap [0];
                                outFile << swap [1];
                        } else {
                                // Only one byte left.
                                outFile << sectData [i];
                        }
                }
        } else {
```

Copyright © 1993, 1995 Motorola, Inc.

Appendix
-65-

```
                // Can Write Out as bytes.
                for (i=0; i<numBytes; i++) {
                        outFile << sectData [i];
                }
        }
    } catch (const MWriterCrash& crash) {
            crash.shutup();         //      Shut up the compiler.
    }
}
/***********************************************************************
 *
 *
 * Function:    calcSeekAddresses
 *
 * Description: Calculates all of the file seek addresses in the object file.
 *
 ***********************************************************************
 / void    OutCOFF :: calcSeekAddresses     (void)
{
        UINT32      sectDataSeekAddress=0,
                        relocSeekAddress=0,
                        lineSeekAddress=0;

UINT32      i=0,
                        j=0;

CHAR*       name=NULL; // Used to print the section name.
        UINT32      nameLength=0;

INT32 offset=0;     //      Used to calculate the seek address.

//      Has this been called before?
        if (headersWritable == FALSE) {
                return;
        }

//      Make sure all section headers have been written and no more can be.
        for (i=1; i<=numSections; i++) {
                if (!dirtySections [i]) {
                        /* Error Condition. */
                        ErrInfo error(OBJ_FILE_WRITER, WRITER_ERRORS[WRITER_HEADERS_NOT_WRITTEN],
                                    (const char*) "OutCOFF::calcSeekAddresses",
                                    ErrInfo::ERR_ERROR,
                                    WRITER_CONTEXT_ERROR,
                                    __FILE__,
                                    __LINE__);
                        errHandle(error, ERR_PUT);
                        return;
```

Copyright © 1993, 1995 Motorola, Inc.

Appendix
-66-

```
        }
    }

// Prohibit the writing of headers.
    headersWritable = FALSE;

// Calculate the seek addresses in each section header: sectDataSeekAddress,
    //       relocSeekAddress, and lineSeekAddress.

// Calculate each section data seek address.
    sectSeekAddress = FILE_HDR_SIZE + sizeOptional;

// Calculate each section data seek address.
    sectDataSeekAddress = FILE_HDR_SIZE + sizeOptional + (numSections *
SECT_HEAD_SIZE);
    for (i=1; i<=numSections; i++) {
        if ((sections [i].getSectSize ()) && (sections [i].getType () != BSS)) {
            sections [i].setSectDataSeekAddress (sectDataSeekAddress);
        } else {
            sections [i].setSectDataSeekAddress (0);
        } if (sections [i].getType () != BSS) {
            sectDataSeekAddress += sections [i].getSectSize ();
        }
    }

// Calculate each relocation entry seek address.
    relocSeekAddress = sectDataSeekAddress;
    for (i=1; i<=numSections; i++) {
        if (sections [i].getNumRelocs ()) {
            sections [i].setRelocSeekAddress (relocSeekAddress);
        } else {
            sections [i].setRelocSeekAddress (0);
        } relocSeekAddress += sections [i].getNumRelocs () * RELOC_SIZE;
    }

// Calculate each line number entry seek address.
    lineSeekAddress = relocSeekAddress;
    for (i=1; i<=numSections; i++) {
        if (sections [i].getNumLines ()) {
            sections [i].setLineSeekAddress (lineSeekAddress);
        } else {
            sections [i].setLineSeekAddress (0);
        } lineSeekAddress += sections [i].getNumLines () * LINE_SIZE;
    }

// The symbol table seek address immediately follows the line number entries.
    symSeekAddress = lineSeekAddress;
```

Copyright © 1993, 1995 Motorola, Inc.

Appendix
-67-

```cpp
// Calculate the string table seek address from the symbol table SeekAddress.
stringSeekAddress = symSeekAddress + (numSymbols * SYMBOL_SIZE);

// Print out all of the headers.

// Print out the file header.
// Seek to the beginning of the file.
outFile.seekp (baseSeekAddress, MSA_SEEK_BEG);
if (!outFile.good() || (outFile.tellp () != 0)) {
        /* Error Condition. */
        ErrInfoerror(OBJ_FILE_WRITER,
                        WRITER_ERRORS[WRITER_FILE_SEEK_FAILURE],
                        (const char*) "OutCOFF::calcSeekAddresses",
                        ErrInfo::ERR_ERROR,
                        WRITER_SYSTEM_ERROR,
                        __FILE__,
                        __LINE__);
        errHandle(error, ERR_PUT);
        return;
}

//      Calculate the fileFlags.
//      First clear effected bits.
fileFlags = 0;

//      Then set appropriate bits.
fileFlags |= (UINT16) (relocStripped  << FLAG_POS_REL);
fileFlags |= (UINT16) (executable     << FLAG_POS_EXEC);
fileFlags |= (UINT16) (lineStripped   << FLAG_POS_LNNO);
fileFlags |= (UINT16) (symStripped    << FLAG_POS_SYMS);
fileFlags |= (UINT16) (archInd        << FLAG_POS_ARCH_IND);
if (fileEndianness == BIG) {
        fileFlags |= FLAG_MASK_AR32W;
} else {        //      Little
        if (hostSize == HOST_SIZE_32) {
                fileFlags |= (UINT16) FLAG_MASK_AR32WR;
        } else {        //      16 bits.
                fileFlags |= (UINT16) FLAG_MASK_AR16WR;
        }
}

// Write out the file header elements.
try {
        outFile << magicNumber;
        outFile << numSections;
        outFile << timeDate;
        outFile << symSeekAddress;
        outFile << numSymbols;
        outFile << sizeOptional;
        outFile << fileFlags;

if (sizeOptional != 0) {
                // Print out the optional header if present.
```

Copyright © 1993, 1995 Motorola, Inc.

Appendix
-68-

```
// Seek to the begin of the optional header.
offset = baseSeekAddress + OPT_SEEK_ADDRESS;
outFile.seekp(offset, MSA_SEEK_BEG);
if (!outFile.good() || (outFile.tellp () != offset)) {
        /* Error Condition. */
        ErrInfoerror(OBJ_FILE_WRITER,
                                WRITER_ERRORS[WRITER_FILE_SEEK_FAILURE],
                                (const char*) "OutCOFF::calcSeekAddresses",
                                ErrInfo::ERR_ERROR,
                                WRITER_SYSTEM_ERROR,
                                __FILE__,
                                __LINE__);
        errHandle(error, ERR_PUT);
        return;
}

// Write Out the magic number.
outFile << optionalHeader.getOptMagicNumber  ();

// Write Out the versionStamp.
outFile << optionalHeader.getVersionStamp ();

// Write Out the size of the text section.
outFile << optionalHeader.getTextSize    ();

// Write Out the size of the data section.
outFile << optionalHeader.getDataSize    ();

// Write Out the size of the bss seciton.
outFile << optionalHeader.getBssSize     ();

// Write Out the entry point.
outFile << optionalHeader.getEntry ();

// Write Out the address of the base of the code.
outFile << optionalHeader.getTextBase    ();

// Write Out the address of the base of the data.
outFile << optionalHeader.getDataBase    ();
}

// Print out each section header.
// Seek to the beginning of the first section header.
offset = baseSeekAddress + sectSeekAddress;
outFile.seekp(offset, MSA_SEEK_BEG);
if (!outFile.good() || (outFile.tellp () != offset)) {
        /* Error Condition. */
        ErrInfoerror(OBJ_FILE_WRITER,
                        WRITER_ERRORS[WRITER_FILE_SEEK_FAILURE],
                        (const char*) "OutCOFF::calcSeekAddresses",
                        ErrInfo::ERR_ERROR,
```

Copyright © 1993, 1995 Motorola, Inc.

Appendix
-69-

```
                                WRITER_SYSTEM_ERROR,
                                __FILE__,
                                __LINE__);
            errHandle(error, ERR_PUT);
            return;
    }

// Print out each section header.
    for (i=1; i<=numSections; i++) {
            // Print out the section name.
            name = sections [i].getName ();
            if (name == NULL) {
                    /* Error Condition. */
                    ErrInfoerror(OBJ_FILE_WRITER, WRITER_ERRORS[WRITER_INVALID_SECTION_NAME],
                                    (const char*)
"OutCOFF::calcSeekAddresses",
                                    ErrInfo::ERR_ERROR,
                                    WRITER_CONTEXT_ERROR,
                                    __FILE__,
                                    __LINE__);
                    errHandle(error, ERR_PUT);
                    return;
            }

//
            nameLength = STRLEN (name);
            for (j=0; j<COFF_SECTION_NAME_SIZE; j++) {
                    if (j < nameLength) {
                            outFile << name [j];
                    } else {
                            outFile << '\0';
                    }
            } delete[] name;
            name = NULL;

// Print out the rest of each section header.
            outFile << sections [i].getPhysicalAddress ();
            outFile << sections [i].getVirtualAddress ();
            outFile << sections [i].getSectSize ();
            outFile << sections [i].getSectDataSeekAddress ();
            outFile << sections [i].getRelocSeekAddress ();
            outFile << sections [i].getLineSeekAddress ();
            outFile << (UINT16) sections [i].getNumRelocs ();
            outFile << (UINT16) sections [i].getNumLines ();
            outFile << sections [i].getFlags ();
    }
} catch (const MWriterCrash& crash) {
    crash.shutup();       //    Shut up the compiler.
}
}
```

Copyright © 1993, 1995 Motorola, Inc.

Appendix
-70-

```
/************************************************************************
 *
 *
 * Function:    stringTableWrite
 *
 * Description: Prints out the string table.
 *
 ************************************************************************
 / void OutCOFF :: stringTableWrite (void)
{
        UINT32     i=0;
        UINT32     sizeUsed=0;
        INT32 offset=0;       //      Used to calculate the seek address.

// Seek to the beginning of the string table.
        offset = baseSeekAddress + stringSeekAddress;
        outFile.seekp (offset, MSA_SEEK_BEG);
        if (!outFile.good() || (outFile.tellp () != offset)) {
                /* Error Condition. */
                ErrInfoerror(OBJ_FILE_WRITER,
                              WRITER_ERRORS[WRITER_FILE_SEEK_FAILURE],
                              (const char*) "OutCOFF::stringTableWrite",
                              ErrInfo::ERR_ERROR,
                              WRITER_SYSTEM_ERROR,
                              __FILE__,
                              __LINE__);
                errHandle(error, ERR_PUT);
                return;
        }

// Write out the byte count of the string table.
        sizeUsed = stringTable.getSizeUsed ();
        if (sizeUsed) {
                outFile << (sizeUsed +4);

// Write out the string table.
                try {
                        for (i=0; i<sizeUsed; i++) {
                                outFile << stringTable.getTableChar (i);
                        }
                } catch (const MWriterCrash& crash) {
                        crash.shutup();        //    Shut up the compiler.
                }
        }
}

/************************************************************************
 *
 *
```

Copyright © 1993, 1995 Motorola, Inc.

Appendix
-71-

```
*       COPYRIGHT (c) 1993 MOTOROLA INC.
*       ALL RIGHTS RESERVED
*
*       The code is the property of Sector Technology and is Motorola
*       Confidential Proprietary Information.
*
*       The copyright notice above does not evidence any
*       actual or intended publication of such source code.
*
* Filename:    $Source: /usr/msa/vault/cvsroot/inc/oendfile.hxx,v $
* Author:      $Author: aweiner $
* Locker:      $Locker: $
* State:       $State: Exp $
* Revision:    $Revision: 5.3 $
*
* History:     Issue RLOG command against the RCS version of this file
*              to view revision history and lock status.
*
* Description: Contains the class declaration for class InEndianFile.
*              Class InEndianFile contains low level file I/O routines.
*
* Notes:
*
**************************************************************************
/ ifndef MSA_OENDFILE_HXX
define  MSA_OENDFILE_HXX static char rcs_oendfile_hxx[] = "$RCSfile: oendfile.hxx,v $ $Revision: 5.3 $"; /* RCS identifiers
*/ include        "objwrite.hxx"

class OutEndianFile
{ private: // Private Data

// Flag to hold the endianness of the file.
        Endianness              fileEndianness;

// Flag to hold the endianness of the processor.
        Endianness              procEndianness;

// Word size of the host processor where the file was written.
        HostSize        hostSize;

// Output stream from the object file. Inherited from OutObj.
        ofstream        outFile;

public:          // Public member functions.
```

Copyright © 1993, 1995 Motorola, Inc.

Appendix
-72-

```
// The constructor for OutEndianFile.
OutEndianFile (const char*, Endianness, Endianness, HostSize);

// The destructor for OutEndianFile.
~OutEndianFile ();

// Endian friendly byte data writers. Inherited from OutObj.
    void operator<<    (UINT32);       // Write a unsigned 32 bit longword.
    void operator<<    (INT32);        // Write a 32 bit longword.
    void operator<<    (UINT16);       // Write a unsigned 16 bit word.
    void operator<<    (INT16);        // Write a 16 bit word.
    void operator<<    (UCHAR);        // Write a unsigned character.
    void operator<<    (CHAR);         // Write a unsigned character.

// File manipulation Routines.
    Boolean        bad        (void) { return (Boolean) outFile.bad (); }
    Boolean        good       (void) { return (Boolean) outFile.good (); }
    void    seekp  (streampos, SeekDir);
    streampos   tellp  (void);
    void           close       (void);
};

// A macro used to construct the ofstream for different compilers.
#if     (defined(__BCPLUSPLUS__) || defined(WATCOM) || defined(_MSC_VER) ||
defined(MSDOS))
#    define OUTFILE_OPEN(filename)   outFile (fileName, (ios::binary|ios::out))
#else
#    define OUTFILE_OPEN(filename)   outFile (fileName, ios::out)
endif // __BCPLUSPLUS__ endif // MSA_OENDFILE_HXX
/************************************************************************
*
*
*       COPYRIGHT (c) 1993 MOTOROLA INC.
*       ALL RIGHTS RESERVED
*
*       The code is the property of Sector Technology and is Motorola
*       Confidential Proprietary Information.
*
*       The copyright notice above does not evidence any
*       actual or intended publication of such source code.
*
* Filename:    $Source: /usr/msa/vault/cvsroot/libsrc/objrw/writer/src/oobj.cxx,v $
* Author:      $Author: aweiner $
* Locker:      $Locker: $
* State:       $State: Exp $
* Revision:    $Revision: 5.5 $
*
* History:     Issue RLOG command against the RCS version of this file
*              to view revision history and lock status.
*
* Description: Contains the member functions for class InObj.
*
```

Copyright © 1993, 1995 Motorola, Inc.

Appendix
-73-

```
* Functions:  OutObj
*            ~OutObj
*
* Notes:
*
***********************************************************************
/ static char rcs_oobj_cxx[] = "$RCSfile: oobj.cxx,v $ $Revision: 5.5 $"; /* RCS identifiers */ include     "objwrite.hxx"

/**********************************************************************
*
*
* Function:   OutObj
*
* Description: Constuctor for class OutObj.
*
***********************************************************************
/

OutObj :: OutObj (const char* fileName, Endianness fileEndian, Endianness procEndian,
                  HostSize size, Boolean newFile, FileHeader* header,
                  UINT32 arch, UINT32 baseSeek):
outFile (fileName, fileEndian, procEndian, size),    // Construct the endian handling file stream.
fileEndianness (fileEndian),    // The endianness of the file.
procEndianness (procEndian),    // The endianness of the processor.
hostSize (size),                // The size of a word in the file.
archInd (arch), // Arch-Independent by default.
baseSeekAddress (baseSeek), //    The seek address of the start of the file.
flavor(FILE_TYPE_UNKNOWN),
magicNumber(0),
numSections(0),
numSymbols(0),
entryPoint(0),
curSymIndex(0),
relocStripped(FALSE),
lineStripped(FALSE),
executable(FALSE),
symStripped(FALSE)
{
        // Check to insure filename is valid.
        if (fileName == NULL ) {
                /* Error Condition. */
                ErrInfo error(OBJ_FILE_WRITER,
                              WRITER_ERRORS[WRITER_INVALID_FILE_NAME],
                              (const char*) "OutObj::OutObj",
                              ErrInfo::ERR_ERROR,
                              WRITER_CONTEXT_ERROR,
                              __FILE__,
                              __LINE__);
                errHandle(error, ERR_PUT);
```

Copyright © 1993, 1995 Motorola, Inc.

Appendix
-74-

```
        }

// Check to insure the input stream was openned correctly.
        if (!outFile.good()) {
                /* Error Condition. */
                ErrInfo error(OBJ_FILE_WRITER,
                              WRITER_ERRORS[WRITER_FILE_OPEN_FAILURE],
                              (const char*) "OutObj::OutObj",
                              ErrInfo::ERR_ERROR,
                              WRITER_CONTEXT_ERROR,
                              __FILE__,
                              __LINE__);
                errHandle(error, ERR_PUT);
        }
}

/***************************************************************************
 *
 *
 * Function:    ~OutObj
 *
 * Description: Destructor for class OutObj.
 *
 ***************************************************************************
 /

OutObj :: ~OutObj ()
{
        // Nothing to do.  File closed by OutEndianFile.
}

/***************************************************************************
 *
 *
 *      COPYRIGHT (c) 1993 MOTOROLA INC.
 *      ALL RIGHTS RESERVED
 *
 *      The code is the property of Sector Technology and is Motorola
 *      Confidential Proprietary Information.
 *
 *      The copyright notice above does not evidence any
 *      actual or intended publication of such source code.
 *
 * Filename:   $Source: /usr/msa/vault/cvsroot/inc/oobj.hxx,v $
 * Author:     $Author: aweiner $
 * Locker:     $Locker:  $
 * State:      $State: Exp $
 * Revision:   $Revision: 5.4 $
 *
 * History:    Issue RLOG command against the RCS version of this file
 *             to view revision history and lock status.
 *
 * Description: Contains the member functions for class InObj.
```

Copyright © 1993, 1995 Motorola, Inc.

Appendix
-75-

```
 *
 * Functions:   OutObj
 *              ~OutObj
 *
 * Notes:
 *
 ***********************************************************************
 / ifndef MSA_OOBJ_HXX
define  MSA_OOBJ_HXX static char rcs_oobj_hxx[] = "$RCSfile: oobj.hxx,v $ $Revision: 5.4 $"; /* RCS identifiers */ include      "objwrite.hxx"

class OutObj
{ protected:              // Protected data.

// Set by the constructor to reflect the flavor of the object file.
        FileType                flavor;

// Set by the constructor to reflect the target processor.
        UINT16          magicNumber;

// The number of sections in the file.
        UINT16          numSections;

// The number of symbols in the symbol table.
        UINT32          numSymbols;

// The entry point for the program.
        UINT32      entryPoint;

// The index of the next symbol to be written.
        UINT32      curSymIndex;

// Flag to indicate whether the section data is written in
        // an architecture independent manner or a backward compatably.
        // Backward compatable COFF uses 32 bit little endian with
        // the section data written in 16 bit words.
        Boolean     archInd;

// An input stream from the object file.
        OutEndianFile outFile;

// Flag to hold the endianness of the file.
        Endianness    -     fileEndianness;

// Flag to hold the endianness of the processor.
```

Copyright © 1993, 1995 Motorola, Inc.

Appendix
-76-

```
        Endianness       procEndianness;

// File Flags
                // Relocation Entries have been stripped.
                Boolean     relocStripped;

// Line Number Entries have been stripped.
                Boolean     lineStripped;

// File is executable.
                Boolean     executable;

// Local symbols have been stripped.
                Boolean     symStripped;

// Word size of the host processor where the file was written.
                HostSize    hostSize;

//      The base seek address for the file.
        //      For use with archives.
        UINT32 baseSeekAddress;

protected:      // Protected functions.

// Constructor for class OutObj.
        OutObj (const char* fileName, Endianness fileEndian, Endianness procEndian,
                        HostSize size, Boolean newFile=TRUE, FileHeader*
header=NULL,
                        UINT32 arch=TRUE, UINT32 baseSeek=0);

public:         // Public functions.

// Destructor for class OutObj.
        virtual ~OutObj (void);

// Routines for Writeing standard data objects.
        virtual void    fileHeaderWrite     (const FileHeader*){};
                                // Write a file header.
        virtual void    sectionHeaderWrite (const Section*, const INT32) = 0;
                // Write a section header.
        virtual void    relocWrite                  (const Reloc*, const UINT32, const INT32)
= 0;    // Write a relocation entry.
        virtual void    lineWrite                   (const Line*, const UINT32, const
INT32){};               // Write a line number entry.
        virtual void    symbolWrite                 (const Symbol* symbol, const UINT32
index) = 0;     // Write a symbol.
        virtual void    nextSymbolWrite     (const Symbol* symbol){};
                        // Read an auxiliary symbol.+
        virtual void    sectionDataWrite    (const UCHAR*, const INT32, const UINT32) = 0;
        // Write the section contents.
```

Copyright © 1993, 1995 Motorola, Inc.

Appendix
-77-

```
    // Accessor functions.
    UINT32     getCurSymIndex      ()             { return curSymIndex; }
    void    setCurSymIndex     (UInt32 index){ curSymIndex = index; }
    void setFlavor (FileType fileType)         { flavor = fileType; }
    void setMagicNumber (MagicNumbers magic)    { magicNumber = magic; }
    void setNumSections (UINT16 sectCount)      { numSections = sectCount; }
    void setNumSymbols (UINT32 symCount)        { numSymbols = symCount; }
    void setEntryPoint (UINT32 entry)           { entryPoint = entry; }
};

#endif // MSA_OOBJ_HXX

/************************************************************************
*
*
*    COPYRIGHT (c) 1993 MOTOROLA INC.
*    ALL RIGHTS RESERVED
*
*    The code is the property of Sector Technology and is Motorola
*    Confidential Proprietary Information.
*
*    The copyright notice above does not evidence any
*    actual or intended publication of such source code.
*
* Filename:   $Source: /usr/msa/vault/cvsroot/inc/reloc.hxx,v $
* Author:     $Author: aweiner $
* Locker:     $Locker: $
* State:      $State: Exp $
* Revision:   $Revision: 5.6 $
*
* History:    Issue RLOG command against the RCS version of this file
*             to view revision history and lock status.
*
* Description:
*
* Notes:
*
************************************************************************
/
#ifndef MSA_RELOC_HXX
define  MSA_RELOC_HXX static char rcs_reloc_hxx[] = "$RCSfile: reloc.hxx,v $ $Revision: 5.6 $"; /* RCS identifiers */ include      "mstructs.hxx"

//     The valid values of the relocation entry types.
```

Copyright © 1993, 1995 Motorola, Inc.

Appendix
-78-

```
typedef enum {
RELOC_ABSOLUTE=0,
RELOC_PAGE=0xd,
RELOC_REL_20=0xe,
RELOC_REL_BYTE=0xf,
RELOC_REL_WORD=0x10,
RELOC_REL_LONG=0x11,
RELOC_PC_REL_BYTE=0x12,
RELOC_PC_REL_WORD=0x13,
RELOC_PC_REL_LONG=0x14
}RelocationTypes;

//      Mask and shift value to obtain the page value.
const   UInt32 PAGE_MASK = 0x000f0000;
const   UInt32 SHIFT_24 = 24;
const   UInt32 SHIFT_16 = 16;
const   UInt32 SHIFT_8 = 8;

//      Mask for bits 0-19.
const   UInt32 MASK_20 = 0x000fffff;

//      Mask for bits 0-15.
const   UInt32 MASK_16 = 0x0000ffff;

//      Mask for bits 0-7.
const   UInt32 MASK_8 = 0x000000ff;

//      Limit values.
const   UInt32 LOW_8 = 0xffffff80;
const   UInt32 LOW_16 = 0xffff8000;
const   UInt32 LOW_20 = 0xfff80000;
const   UInt32 HIGH_8 = 0x000000ff;
const   UInt32 HIGH_16 = 0x0000ffff;
const   UInt32 HIGH_20 = 0x000fffff;

class Reloc
{
private:
        UINT32   address;       // An offset into the section of the data to be patched.
        UINT32   symIndex;      // An index into the symbol table.
        UINT32   type;          // The type of relocation entry.

UINT32   sectionNum;    // The number of the associated section.
        Symbol*  symEntry;      // A pointer to the internal structure holding the associated symbol.

public:

// Constructor and Descructor.
        Reloc (void): address( 0L ), symIndex( 0L ), type( 0L ), sectionNum( 0L ), symEntry (NULL) {};
        ~Reloc (void);
```

Copyright © 1993, 1995 Motorola, Inc.

Appendix
-79-

```
            UINT32     getAddress       (void) const   {    return address;
   };
            UINT32     getSymIndex      (void) const   {    return symIndex;
   };
            UINT32     getType                 (void) const   {    return type;
            };
            UINT32     getSectionNum    (void) const   {    return sectionNum;
   };
            Symbol*    getSymEntry      (void) const   {    return symEntry;
   };

void       setAddress       (const UINT32 val)   {    address = val;
   };
            void       setSymIndex      (const UINT32 val)   {    symIndex = val;
   };
            void       setType                 (const UINT32 val)   {    type = val;
                   };
            void       setSectionNum    (const UINT32 val)   {    sectionNum = val;
   };
            void       setSymEntry      (Symbol* val)            {    symEntry =
val;       };

void dump (void);
};

#endif  // MSA_RELOC_HXX
/****************************************************************************
*
*
*      COPYRIGHT (c) 1993 MOTOROLA INC.
*      ALL RIGHTS RESERVED
*
*      The code is the property of Sector Technology and is Motorola
*      Confidential Proprietary Information.
*
*      The copyright notice above does not evidence any
*      actual or intended publication of such source code.
*
* Filename:    $Source: /usr/msa/vault/cvsroot/inc/sect.hxx,v $
* Author:      $Author: aweiner $
* Locker:      $Locker: $
* State:       $State: Exp $
* Revision:    $Revision: 5.10 $
*
* History:     Issue RLOG command against the RCS version of this file
*              to view revision history and lock status.
*
* Description:
*
* Notes:
*
****************************************************************************
/
```

Copyright © 1993, 1995 Motorola, Inc.

Appendix
-80-

```cpp
#ifndef SECT_HXX
define SECT_HXX static char rcs_sect_hxx[] = "$RCSfile: sect.hxx,v $ $Revision: 5.10 $"; /* RCS identifiers */ include    <string.h> include    "mstructs.hxx"

define SECT_NUM_DEBUG      -2
#define SECT_NUM_ABSOLUTE   -1
define SECT_NUM_UNDEF      0 enum SectionAttributes {
SECT_UNKNOWN = 0x00000000,
SECT_NORESERVE = 0x00000001,
SECT_NOLOAD = 0x00000002,
SECT_NOBIND = 0x00000004,
SECT_PAD = 0x00000010,
SECT_LIB = 0x00000020,
SECT_COPY = 0x00000040,
SECT_INFO =     0x00000080,
SECT_DUMMY = 0x00000100
};

class Section
{
private:

CHAR*       name;           // The name of the section.

UINT32      physicalAddress;    // The physical address of the section.
        UINT32      virtualAddress;     // The virtual address of the section.
        INT32 sectNumber;   // The number of the section in the object file.
        UINT32      sectSize;       // The number of bytes in the section's raw data.
        UINT32      sectDataSeekAddress; // A seek address for the section data.
        UINT32      relocSeekAddress;   // A seek address for the relocation entries.
        UINT32      lineSeekAddress;    // A seek address for the line number entries.
        UINT32      numRelocs;  // The number of relocation entries for the section.
        UINT32      numLines;   // The number of line number entries for the section.
                                // (This will always be zero for ELF files.)
        UINT32      flags;      // The flags for the section as represented in the file.

// Used for ELF or IEEE only.
        UINT32      alignment;
        UINT32      entrySize;
        UINT32      regionSize;
        UINT32      regionAddr;
        UINT32      addrExt;

//////////////////////////////////////////////////////////////
```

Copyright © 1993, 1995 Motorola, Inc.

```
// Included for convenience.
CHAR*       fileName;
CHAR*       archiveName;

UINT32 attribs;     // The attributes of the section.
                    // UNKNOWN   = 0x00000000
                    // NORESERVE = 0x00000001
                    // NOLOAD    = 0x00000002
                    // NOBIND    = 0x00000004
                    // PAD       = 0x00000010
                    // LIB       = 0x00000020
                    // COPY            = 0x00000040
                    // INFO      =     0x00000080
                    // DUMMY     = 0x00000100

UINT32      numSymbols;  // The number of symbols associated with the section.

SectionType type;   // The type of the section (text, data, bss, etc.)

/////////////////////////////////////////////////// public:

// Constructor and Destructor.
Section (void):
        name (NULL),
        fileName (NULL),
        archiveName (NULL),
        physicalAddress(0),
        virtualAddress(0),
        sectNumber(0),
        sectSize(0),
        sectDataSeekAddress(0),
        relocSeekAddress(0),
        lineSeekAddress(0),
        numRelocs(0),
        numLines(0),
        flags(0),
        alignment(0),
        entrySize(0),
        regionSize(0),
        addrExt(0),
        attribs(0),
        numSymbols(0),
        type(SECTION_TYPE_UNKNOWN) { };
~Section (void);

// Accessor Functions
inline  void    allocName(const UINT32 size);
inline  void    allocFileName(const UINT32 size);
inline  void    allocArchiveName(const UINT32 size);
inline  CHAR*   getName(void) const;
inline  CHAR*   getArchiveName(void) const;
```

Copyright © 1993, 1995 Motorola, Inc.

Appendix
-82-

```
UINT32      getVirtualAddress(void) const {      return virtualAddress;      };
INT32 getSectNumber(void) const    {      return sectNumber;         };
UINT32      getSectSize(void) const         (      return sectSize;
};
UINT32      getSectDataSeekAddress(void) const {      return sectDataSeekAddress;
};
UINT32      getRelocSeekAddress (void) const    {      return relocSeekAddress;
};
UINT32      getLineSeekAddress(void) const      {      return lineSeekAddress;
};
UINT32      getNumRelocs(void) const    {      return numRelocs;
};
UINT32      getNumLines(void) const     {      return numLines;
};
UINT32      getFlags(void) const    {   return flags;
};
UINT32      getAlignment(void) const    {      return alignment;
};
UINT32      getEntrySize(void) const    {      return entrySize;
};
UINT32      getRegionSize(void) const   {      return regionSize;
};
UINT32      getRegionAddress(void) const     {      return regionAddr;
};
UINT32      getAddrExt(void) const      {      return addrExt;
};
UINT32      getNumSymbols(void) const {      return numSymbols;
};
UINT32      getAttribs(void) const {      return attribs;         };
SectionType getType(void) const    {   return type;
};

inline  void   setName(const CHAR* val);
       inline  void   setFileName(const CHAR* val);
       inline  void   setArchiveName(const CHAR* val);
       void    setPhysicalAddress(const UINT32 val)         {     physicalAddress = val;
               };
       void    setVirtualAddress(const UINT32 val)       {     virtualAddress = val;
       };
       void    setSectNumber(const INT32 val)            {     sectNumber = val;
               };
       void    setSectSize(const UINT32 val)             {     sectSize = val;
               };
       void    setSectDataSeekAddress(const UINT32 val)         {     sectDataSeekAddress
= val;  };
       void    setRelocSeekAddress(const UINT32 val)            {     relocSeekAddress =
val;           };
       void    setLineSeekAddress(const UINT32 val)             {     lineSeekAddress =
val;           };
       void    setNumRelocs(const UINT32 val)            {     numRelocs = val;
               };
       void    setNumLines(const UINT32 val)             {     numLines = val;
               };
```

Copyright © 1993, 1995 Motorola, Inc.

Appendix
-83-

```
        void    setFlags(const UINT32 val)          {   flags = val;
    };
        void    setAlignment(const UINT32 val)      {       alignment = val;
                };
        void    setEntrySize(const UINT32 val)      {   entrySize = val;
                };
        void    setRegionSize(const UINT32 val)     {   regionSize = val;
                };
        void    setRegionAddress(const UINT32 val)          {       regionAddr = val;
                };
        void    setAddrExt(const UINT32 val)        {   addrExt = val;
                };
        void    setNumSymbols(const UINT32 val)     {   numSymbols = val;
                };
        void    setAttribs(const UINT32 val)    {   attribs = val;
    };
        void    setType(const SectionType val)  {   type = val;
                };

void dump (void);
};

/************************************************************************
 *
 *
 * Function:    allocName
 *
 * Description: Allocates space for the name field.
 *
 * Note:
 *
 ************************************************************************
 / inline  void    Section::allocName(const UINT32 size)
{
        if (name != NULL) {
                delete[] name;
                name = NULL;
        } name = new CHAR [size];
};

/************************************************************************
 *
 *
 * Function:    allocFileName
 *
 * Description: Allocates space for the filename.
 *
 * Note:
```

Copyright © 1993, 1995 Motorola, Inc.

Appendix
-84-

```
 *
 **********************************************************************
 / inline   void    Section::allocFileName(const UINT32 size)
{
        if (fileName != NULL) {
                delete[] fileName;
                fileName = NULL;
        } fileName = new CHAR [size];
};

/**********************************************************************
 *
 *
 * Function:    allocArchiveName
 *
 * Description: Allocates space for the archive name.
 *
 * Note:
 *
 **********************************************************************
 / inline   void    Section::allocArchiveName(const UINT32 size)
{
        if (archiveName != NULL) {
                delete[] archiveName;
                archiveName = NULL;
        } archiveName = new CHAR [size];
};

/**********************************************************************
 *
 *
 * Function:    getName
 *
 * Description: Returns a copy of the section name.
 *
 * Note:
 *
 **********************************************************************
 / inline   CHAR*      Section::getName(void) const
{
        CHAR*      tmpName=NULL;
        UInt32 length=0;
```

Copyright © 1993, 1995 Motorola, Inc.

Appendix
-85-

```
        if (name != NULL) {
                length = strlen(name);
                tmpName = new CHAR[length+1];
                if (strncpy(tmpName, name, length) == NULL) {
                        /*      Error Condition. */
                        ErrInfoerror(STRUCT_LIB, STRUCT_ERRORS[STRUCT_STRING_COPY_FAILURE],
                                        (const char*) "Section::getName",
                                        ErrInfo::ERR_ERROR,
                                        STRUCT_CONTEXT_ERROR,
                                        __FILE__,
                                        __LINE__);
                        errHandle(error, ERR_PUT);
                        delete[] tmpName;
                        tmpName = NULL;
                } else {
                        tmpName[length] = '\0';
                }
        }
        return tmpName;
};

/*****************************************************************************
*
*
* Function:     getFileName
*
* Description: Returns a copy of the filename.
*
* Note:
*
*****************************************************************************
/ inline   CHAR*        Section::getFileName(void) const
{
        CHAR*       tmpName=NULL;
        UInt32 length=0;

if (fileName != NULL) {
                length = strlen(fileName);
                tmpName = new CHAR[length+1];
                if (strncpy(tmpName, fileName, length) == NULL) {
                        /* Error Condition. */
                        ErrInfoerror(STRUCT_LIB, STRUCT_ERRORS[STRUCT_STRING_COPY_FAILURE],
                                        (const char*) "Section::getFileName",
                                        ErrInfo::ERR_ERROR,
                                        STRUCT_CONTEXT_ERROR,
                                        __FILE__,
                                        __LINE__);
```

Copyright © 1993, 1995 Motorola, Inc.

Appendix
-86-

```
                errHandle(error, ERR_PUT);
                delete[] tmpName;
                tmpName = NULL;
            } else {
                tmpName[length] = '\0';
            }
        }
        return tmpName;
};

/************************************************************************
 *
 *
 * Function:    getArchiveName
 *
 * Description: Returns a copy of the archive name.
 *
 * Note:
 *
 ************************************************************************
 / inline  CHAR*       Section::getArchiveName(void) const
{
        CHAR*       tmpName=NULL;
        UInt32 length=0;

if (archiveName != NULL) {
                length = strlen(archiveName);
                tmpName = new CHAR[length+1];
                if (strncpy(tmpName, archiveName, length) == NULL) {
                        //      NULL string is valid.
                        delete[] tmpName;
                        tmpName = NULL;
                } else {
                        tmpName[length] = '\0';
                }
        } return tmpName;
};

/************************************************************************
 *
 *
 * Function:    setName
 *
 * Description: Sets the name of the section.
 *
 * Note:
 *
```

Copyright © 1993, 1995 Motorola, Inc.

Appendix
-87-

```
/***********************************************************************
/ inline   void    Section::setName(const CHAR* val)
{
        if (val == NULL) {
                /* Error Condition. */
                ErrInfoerror(STRUCT_LIB, STRUCT_ERRORS[STRUCT_INVALID_PARAMETER],
                                        (const char*) "Section::setName",
                                        ErrInfo::ERR_ERROR,
                                        STRUCT_CONTEXT_ERROR,
                                        __FILE__,
                                        __LINE__);
                errHandle(error, ERR_PUT);
        }

UINT32 length;
        length = (UINT32) strlen ((char*) val);
        allocName(length+1);
        STRCPY (name, val);
};

/***********************************************************************
*
*
* Function:    setFileName
*
* Description: Sets the filename.
*
* Note:
*
***********************************************************************
/ inline   void    Section::setFileName(const CHAR* val)
{
        if (val == NULL) {
                /* Error Condition. */
                ErrInfoerror(STRUCT_LIB, STRUCT_ERRORS[STRUCT_INVALID_PARAMETER],
                                        (const char*) "Section::setFileName",
                                        ErrInfo::ERR_ERROR,
                                        STRUCT_CONTEXT_ERROR,
                                        __FILE__,
                                        __LINE__);
                errHandle(error, ERR_PUT);
        } else {
                UINT32 length = STRLEN (val);
                allocFileName(length+1);
                STRCPY (fileName, val);
```

Copyright © 1993, 1995 Motorola, Inc.

We claim:

1. An apparatus allowing a software Tool to read a plurality of Object File Formats comprising:

a plurality of Object Code Readers, wherein:
each of the plurality of Object Code Readers reads data formatted in at least one of a plurality of Object File Formats, and
at least two of said plurality of Object Code Readers read data formatted in different ones of the plurality of Object File Formats;

one or more Data Structures storable in a Memory, wherein:
said one or more Data Structures provide a Generalized Object File Format interface; and an Applications Programmers' Interface (API) providing selectable communications allowing data stored in the one or more Data Structures to be transferred between the Tool and one or more of said plurality of Object Code Readers.

2. The apparatus claimed in claim 1 which additionally comprises:

one or more Object Code Writers, wherein:
each of the one or more Object Code Writers writes data formatted in an Object File Format.

3. The apparatus claimed in claim 2 wherein within the element of one or more Object Code Writers:

at least two of said Object Code Writers write data formatted in different Object File Formats.

4. The apparatus claimed in claim 1 which additionally comprises:

a Memory, wherein:
data representing Object Files is stored in the Data Structures in the Memory.

5. The apparatus claimed in claim 1 wherein within the element of the plurality of Object Code Readers:

the Object Code Readers are Dynamically Loadable Modules.

6. The apparatus claimed in claim 1 wherein within the element of the plurality of Object Code Readers:

the Object Code Readers are Dynamically Linkable Library (DLL) modules.

7. The apparatus claimed in claim 1 wherein within the element of an Application Programmers' Interface (API):

the selection of which Object Code Reader to communicate with depends on which Object Code Format is encountered.

8. An apparatus allowing a software Tool to read and write a plurality of Object File Formats comprising:

one or more Object Code Readers, wherein:
each of the one or more Object Code Readers reads data formatted in at least one of the plurality of Object File Formats, and
each of the one or more Object Code Readers is a Dynamically Loadable Module;

one or more Object Code Writers, wherein:
each of the one or more Object Code Writers writes data formatted in at least one of the plurality of Object File Formats, and
each of the one or more Object Code Writers is a Dynamically Loadable Module;

one or more Data Structures storable in a Memory which provide a Generalized Object File Format interface; and an Applications Programmers' Interface (API) providing selectable communications allowing data stored in the one or more Data Structures to be transferred between the Tool and one or more of the Object Code Readers, wherein:
the selection of which Object Code Reader to communicate with and which Object Code Writer to communicate with depends on which Object Code Format is encountered.

* * * * *